(12) United States Patent
Yokoi

(10) Patent No.: US 7,418,937 B2
(45) Date of Patent: Sep. 2, 2008

(54) ENGINE AIR INTAKE ARRANGEMENT FOR A VEHICLE

(75) Inventor: Masato Yokoi, Shizuoka-ken (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 0 days.

(21) Appl. No.: 11/623,660

(22) Filed: Jan. 16, 2007

(65) Prior Publication Data

US 2007/0193804 A1    Aug. 23, 2007

(30) Foreign Application Priority Data

Jan. 17, 2006   (JP)   ............... 2006-009139
Sep. 20, 2006   (JP)   ............... 2006-253638

(51) Int. Cl.
*F02M 35/10*   (2006.01)

(52) U.S. Cl. ............... 123/184.53; 123/184.55

(58) Field of Classification Search ........... 123/590, 123/184.55, 184.53, 184.56, 184.21; 180/219
See application file for complete search history.

(56) References Cited

U.S. PATENT DOCUMENTS

| 4,759,320 A | * | 7/1988 | Fujii et al. | ............... 123/184.55 |
| 4,890,586 A | * | 1/1990 | Fujii et al. | ............... 123/184.55 |
| 5,740,770 A | * | 4/1998 | Morota | ............... 123/184.55 |
| 6,408,810 B1 | * | 6/2002 | Leipelt et al. | ............ 123/184.55 |

FOREIGN PATENT DOCUMENTS

| JP | 63-177627 | 11/1988 |
| JP | 02-223632 | 9/1990 |
| JP | 09-100720 | 4/1997 |

* cited by examiner

*Primary Examiner*—Stephen K. Cronin
*Assistant Examiner*—Hyder Ali
(74) *Attorney, Agent, or Firm*—Knobbe, Martens, Olson & Bear, LLP

(57) ABSTRACT

A vehicle, such as a motorcycle, includes one or more stationary funnels through which air is delivered to an intake port of an engine. One or more movable funnels are arranged on an inlet side of the one or more stationary funnels and cooperating with the stationary funnels to deliver air to the intake port of the engine. A parallel linkage rotatably supports the stationary funnels and includes an upper linkage member and a lower linkage member.

25 Claims, 37 Drawing Sheets

[Fig. 1]
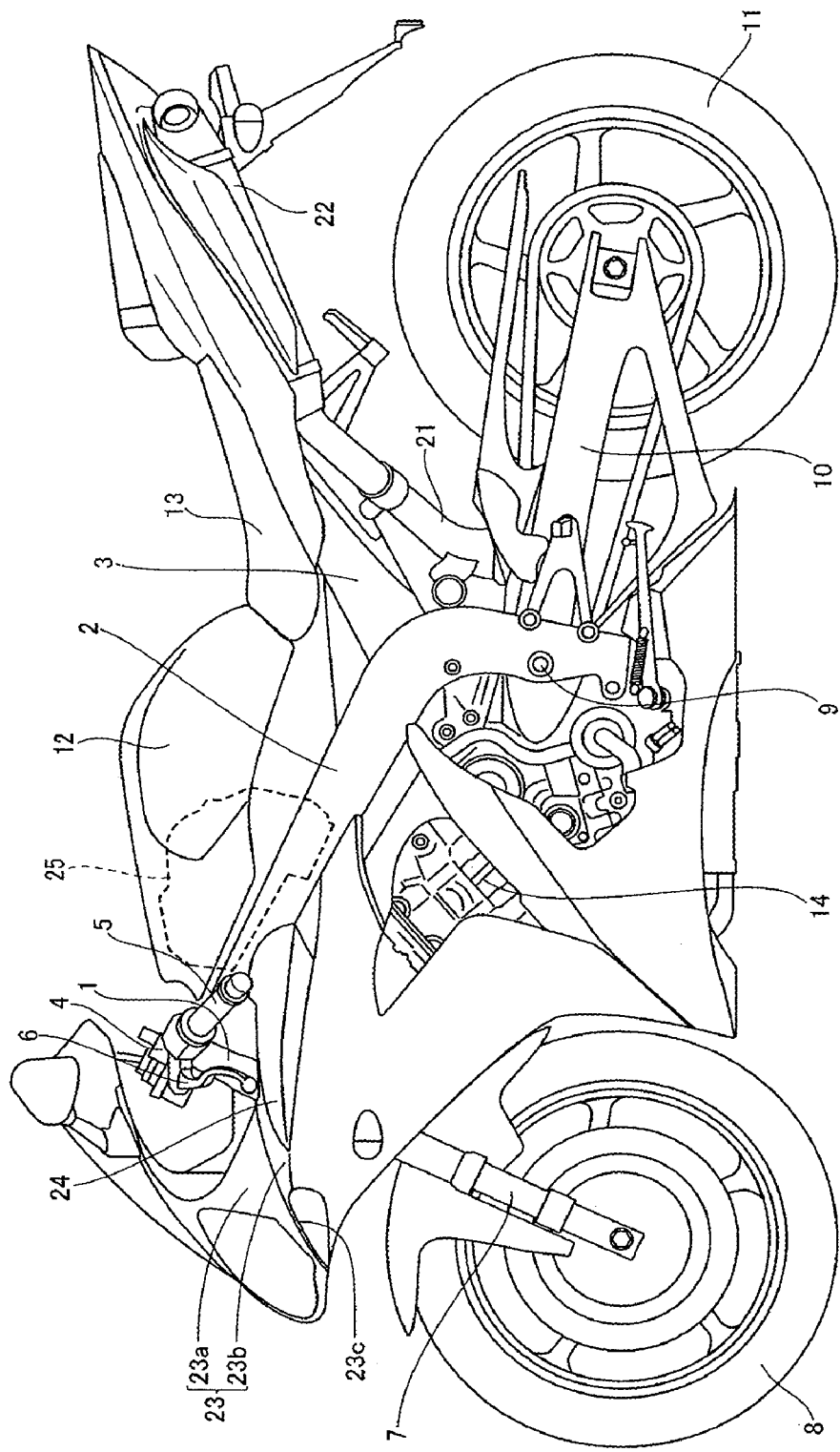

[Fig. 2]
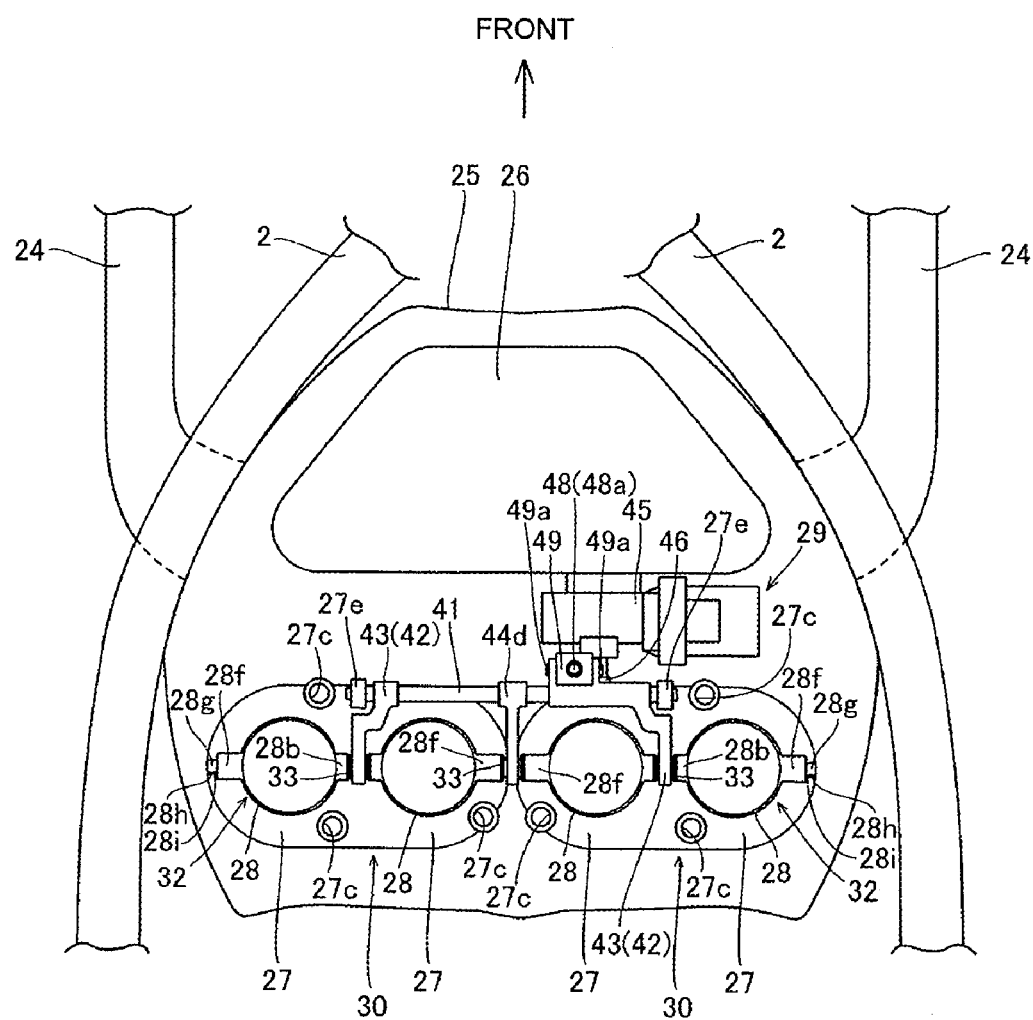

[Fig. 3]
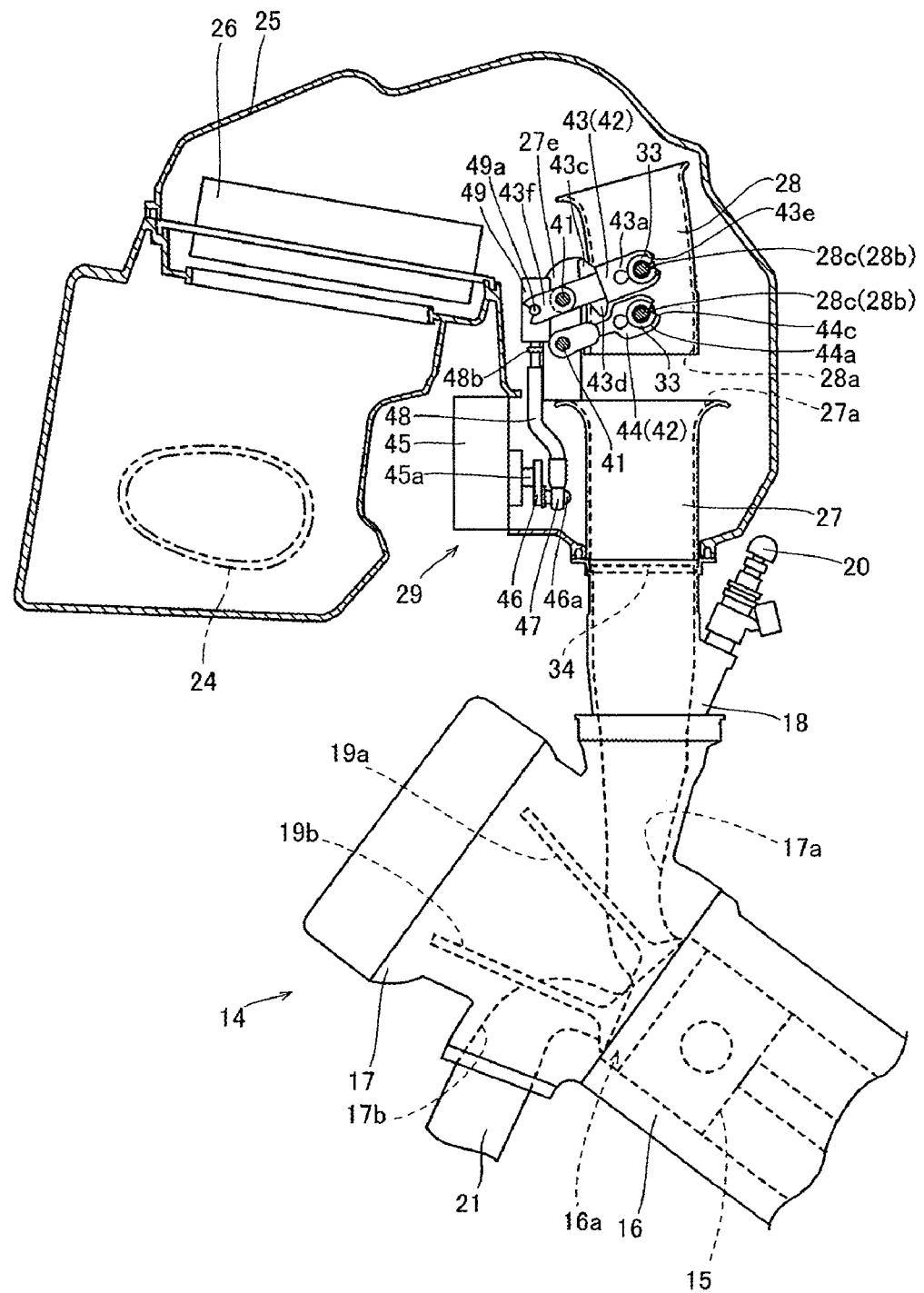

[Fig. 4]
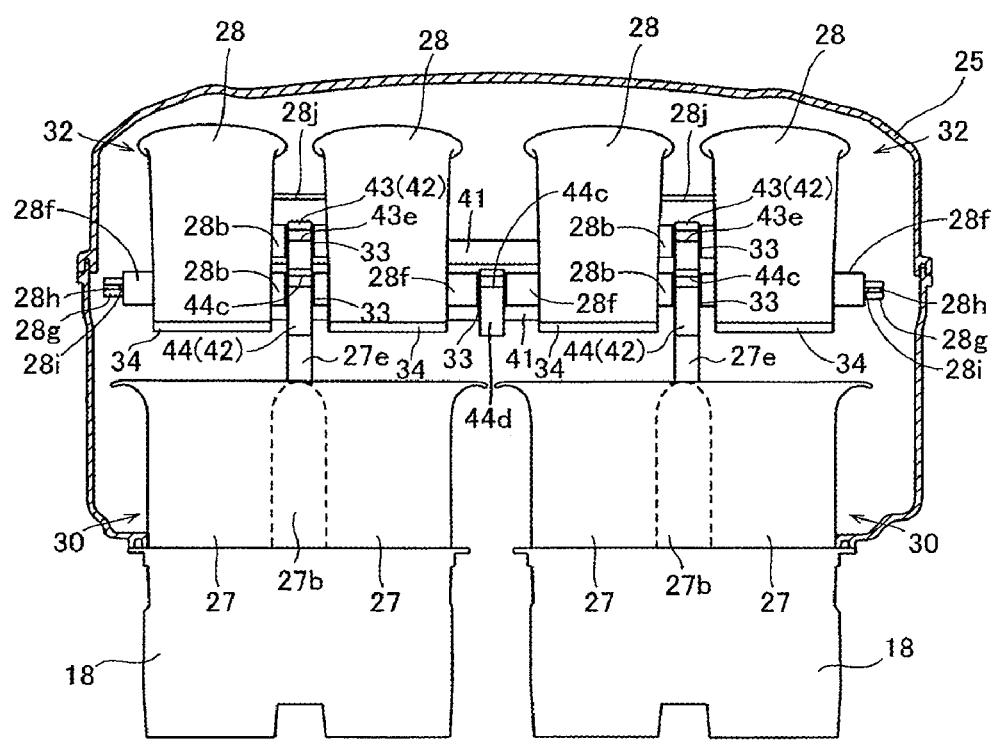

[Fig. 5]
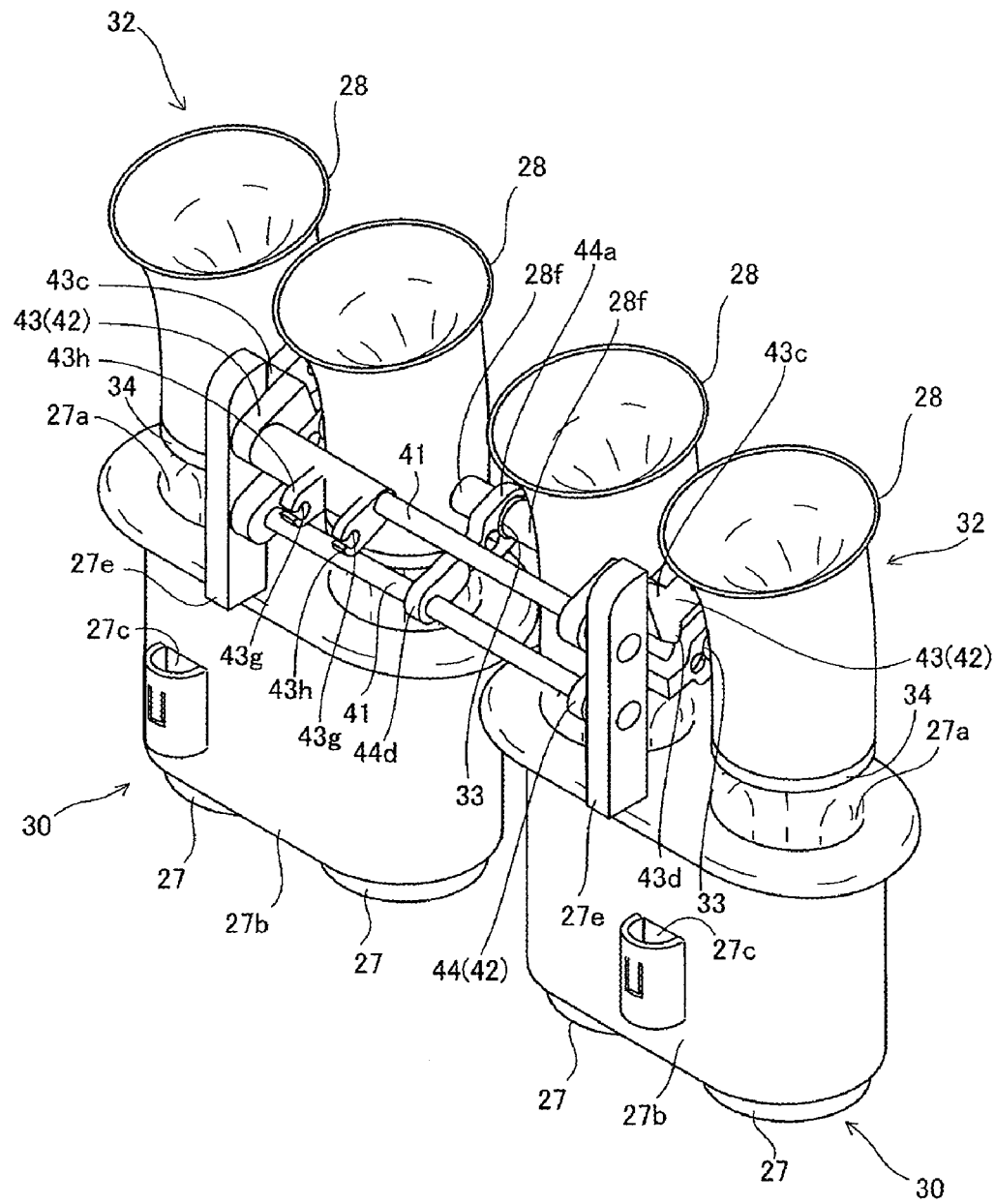

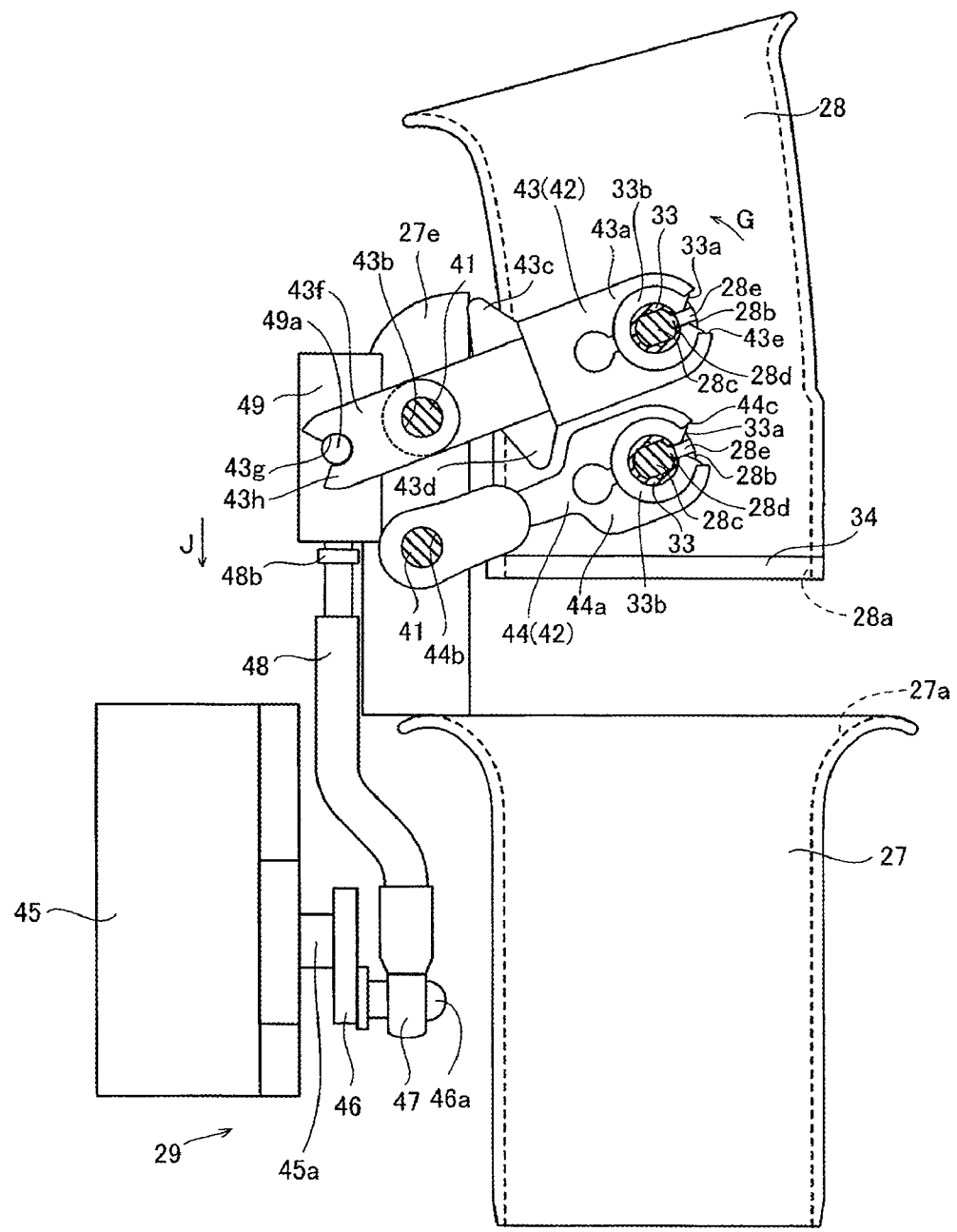
[Fig. 6]

[Fig. 7]
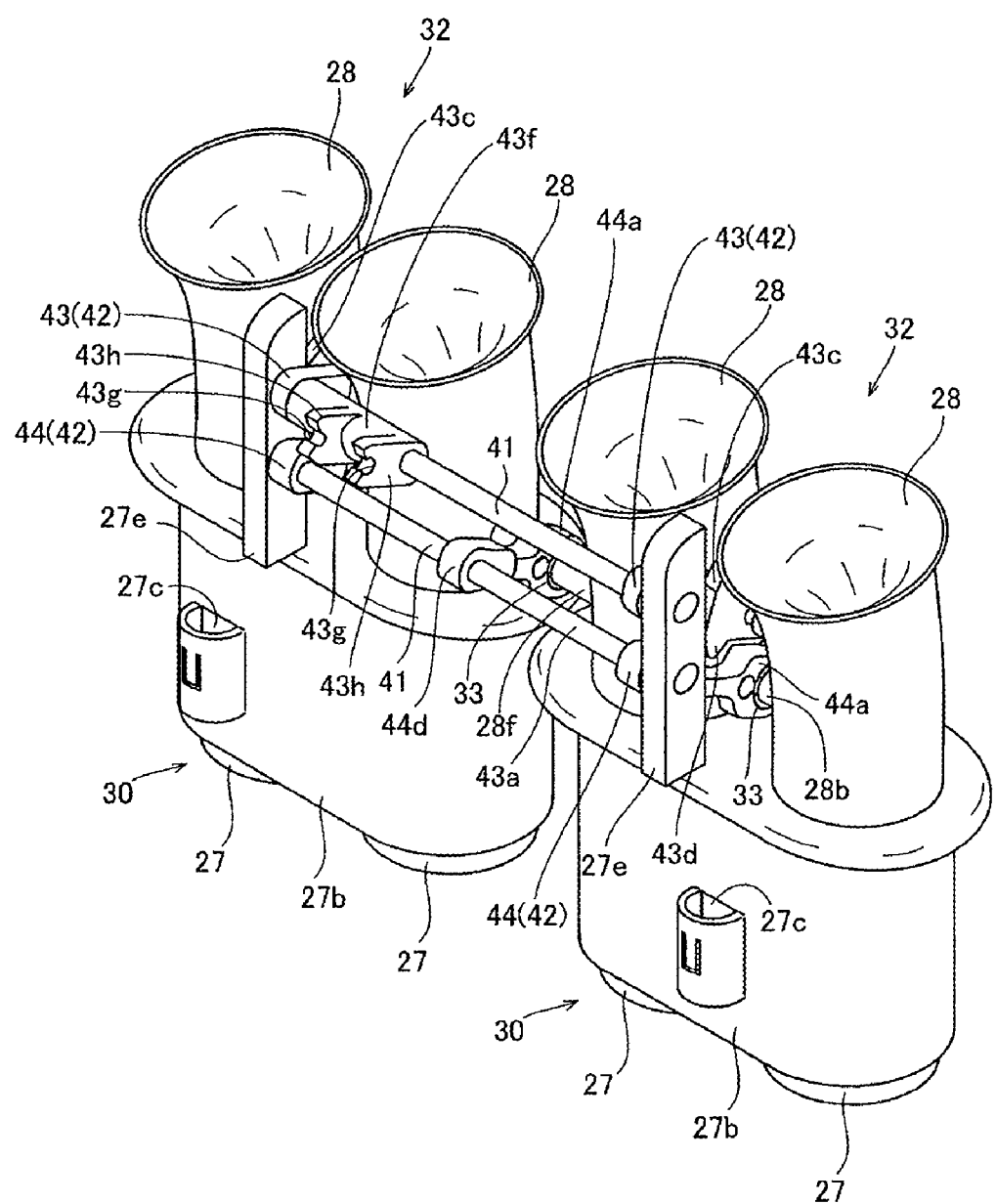

[Fig. 8]
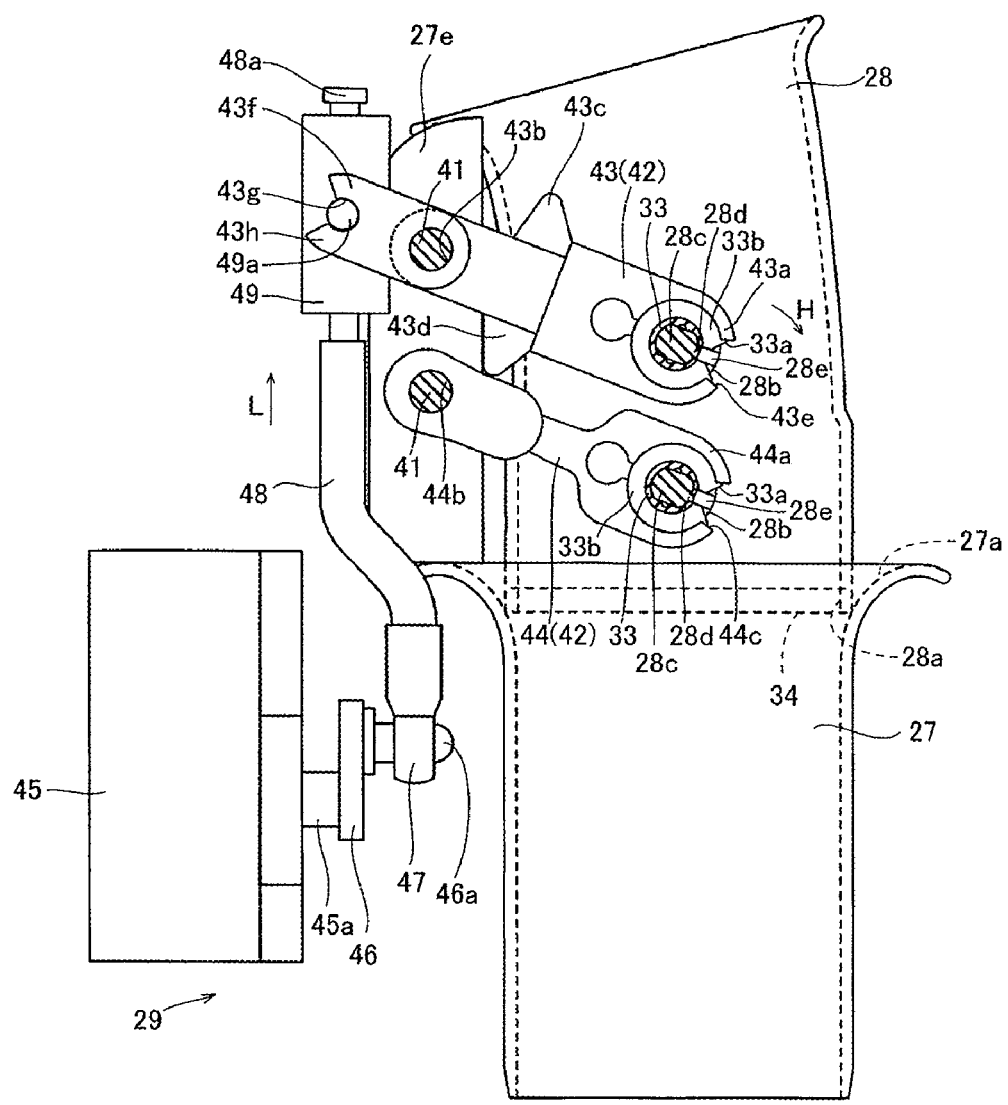

[Fig. 9]
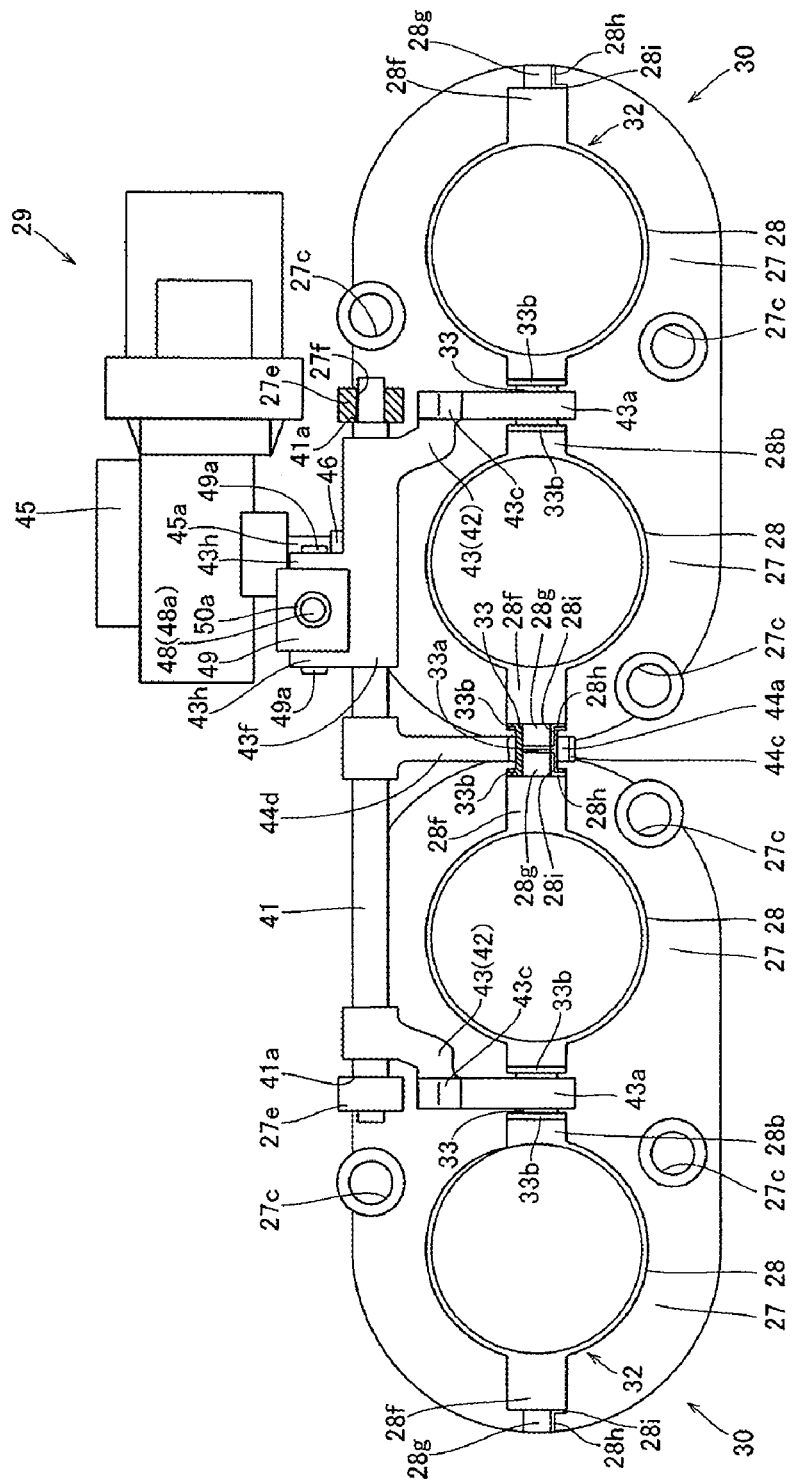

[Fig. 10]
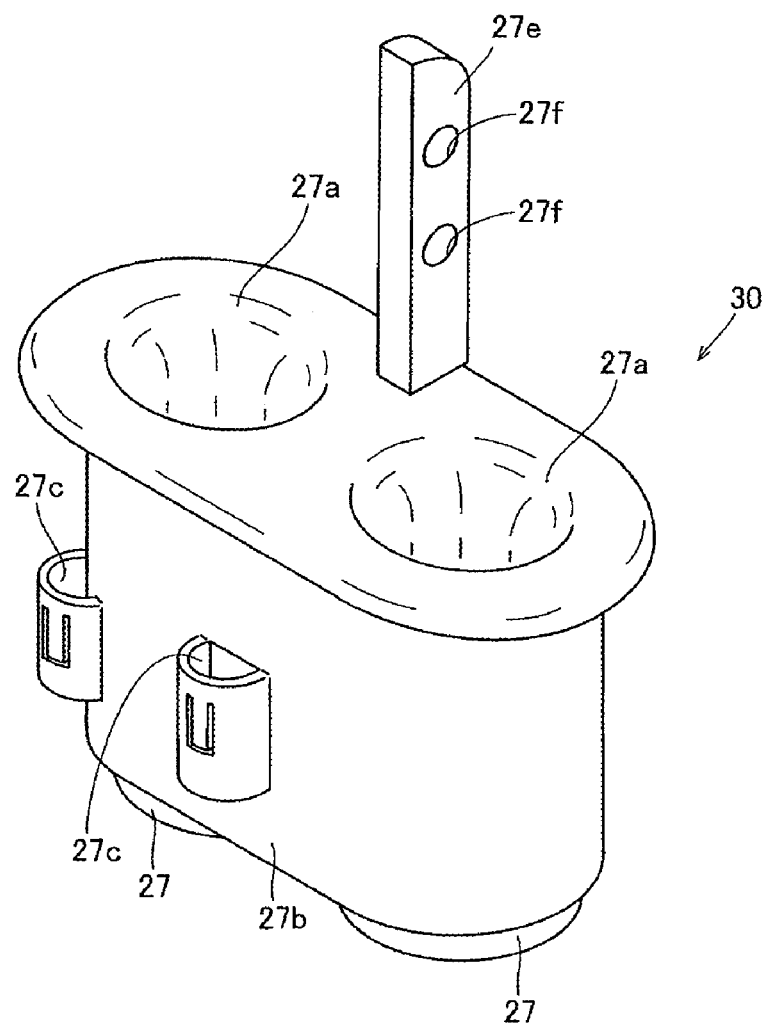

[Fig. 11]
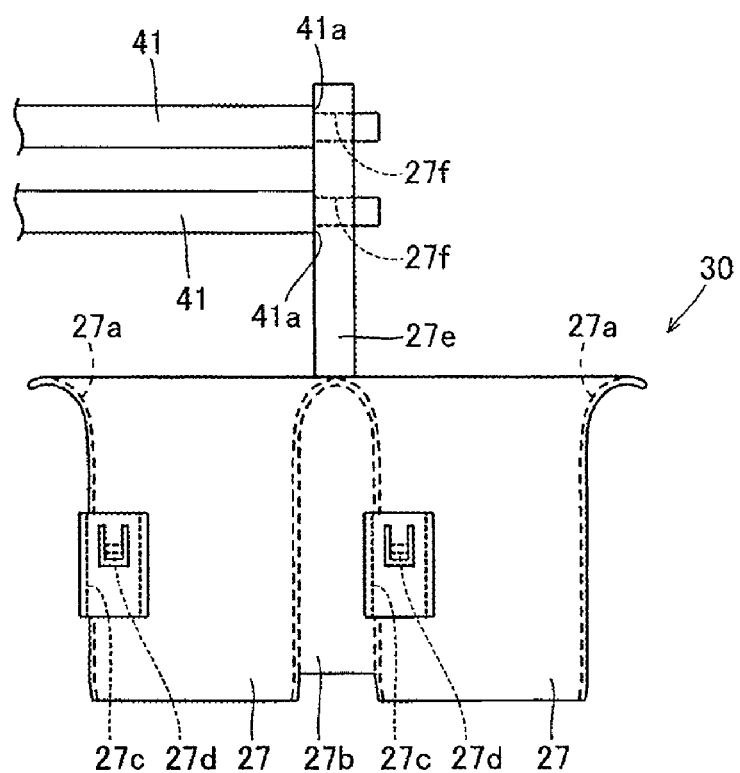

[Fig. 12]
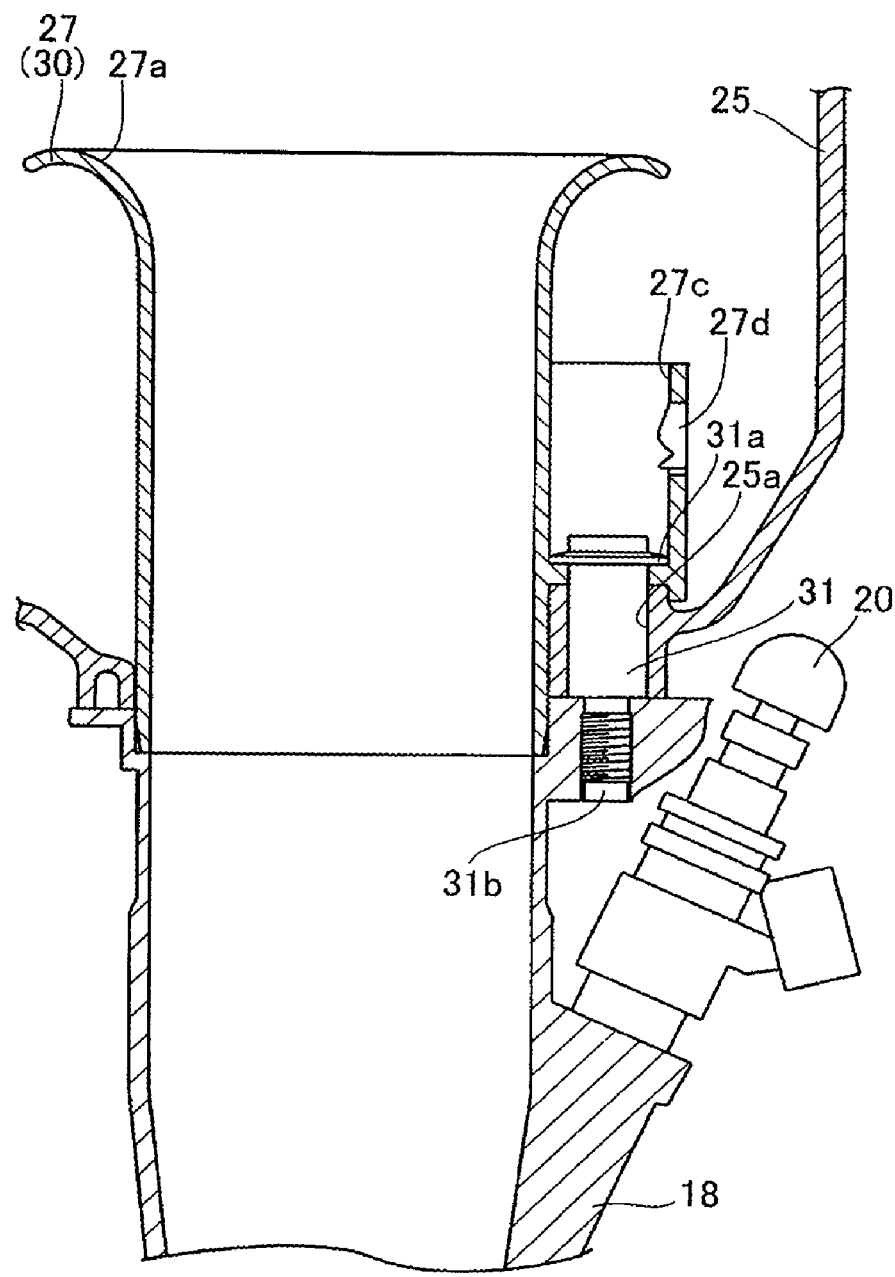

[Fig. 13]
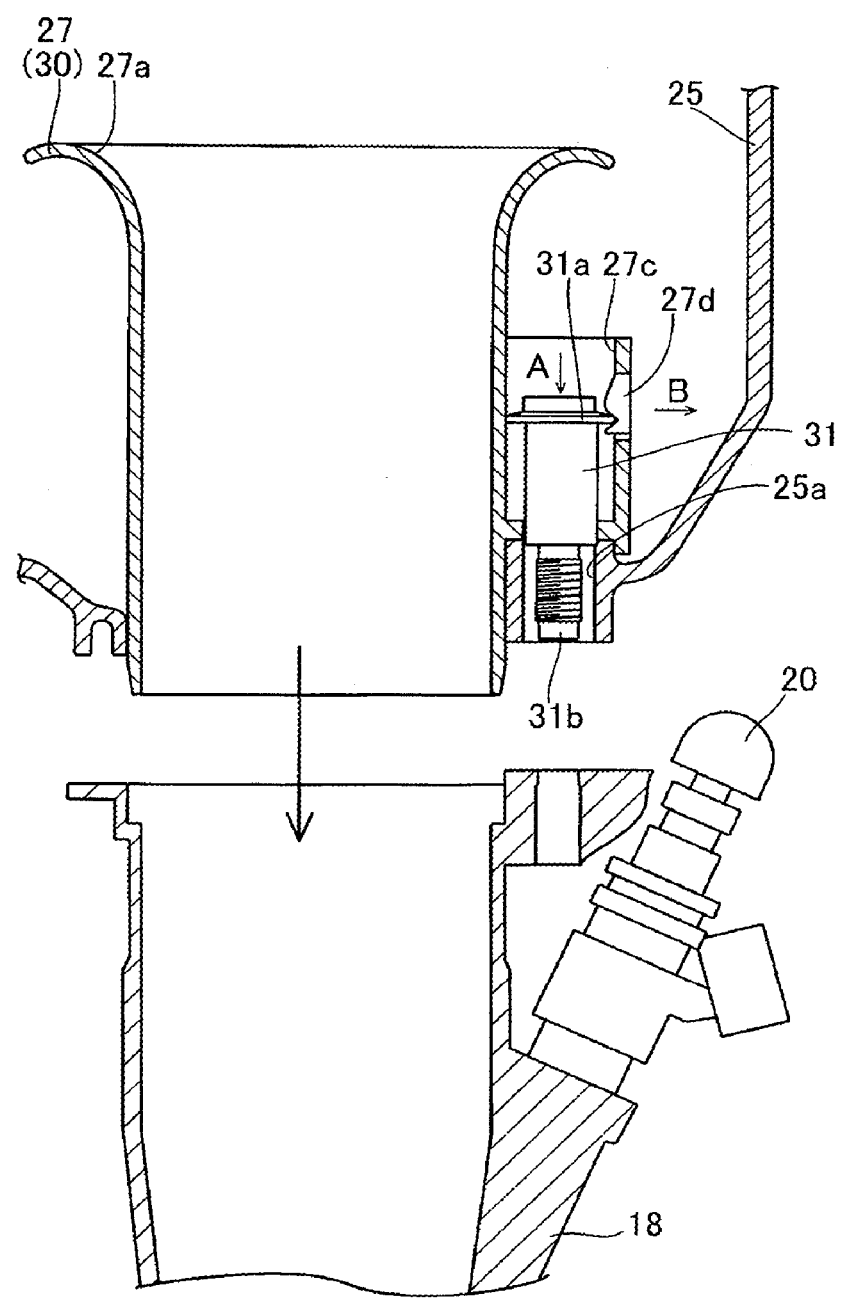

[Fig. 14]
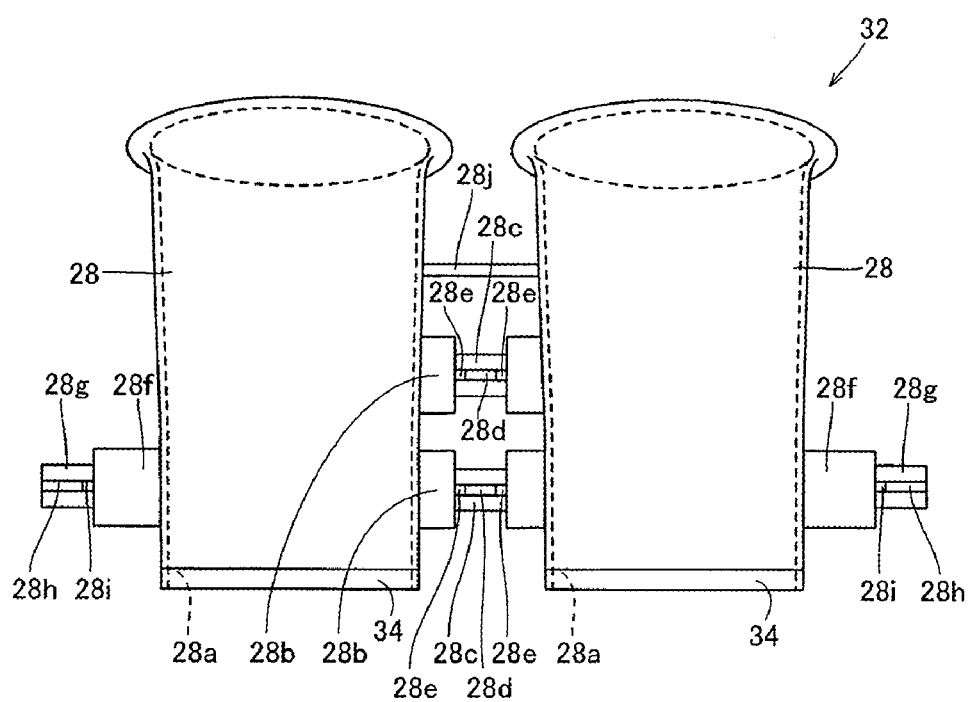

[Fig. 15]
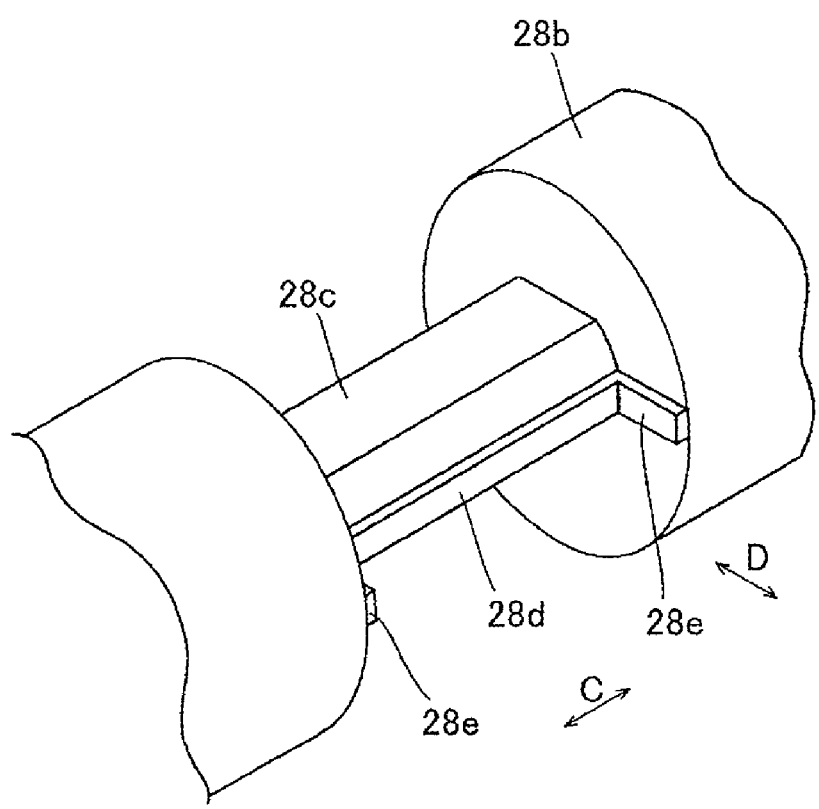

[Fig. 16]
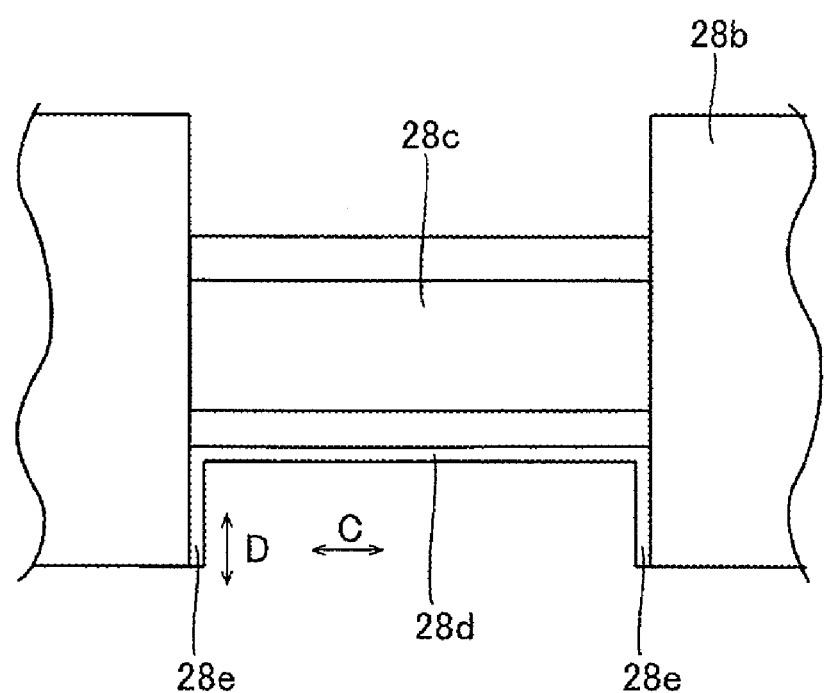

[Fig. 17]
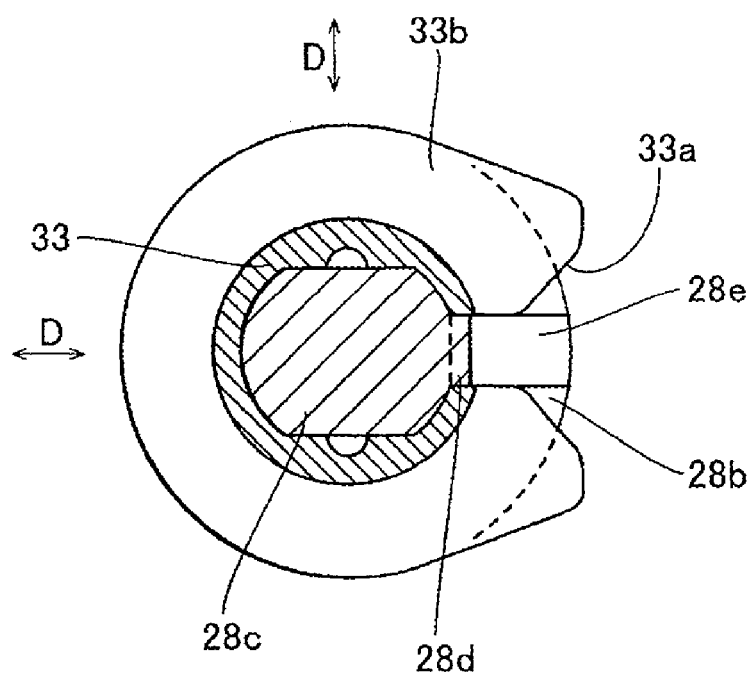

[Fig. 18]
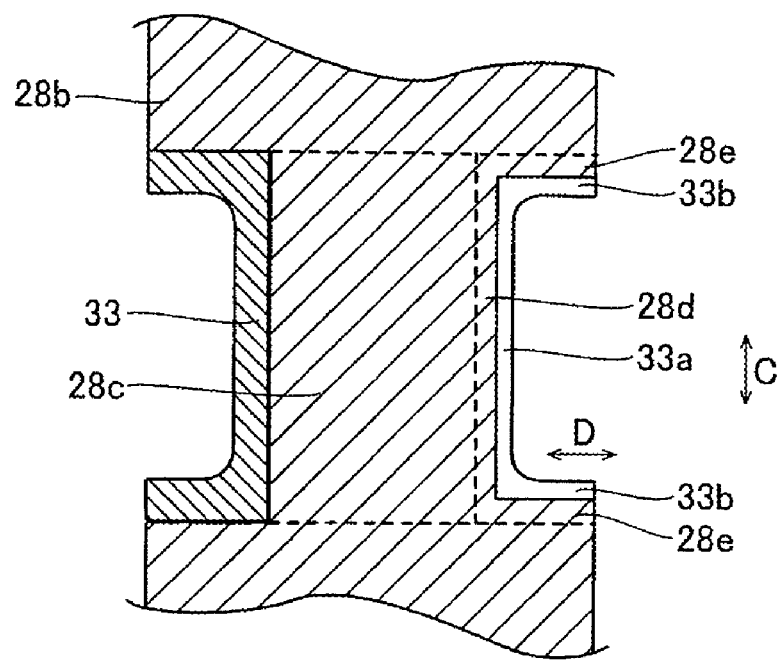

[Fig. 19]
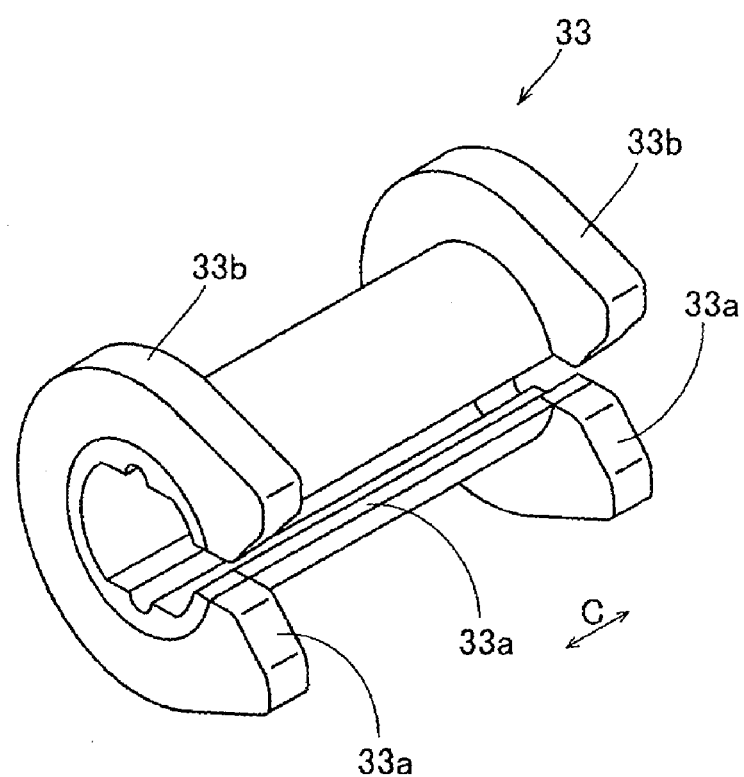

[Fig. 20]
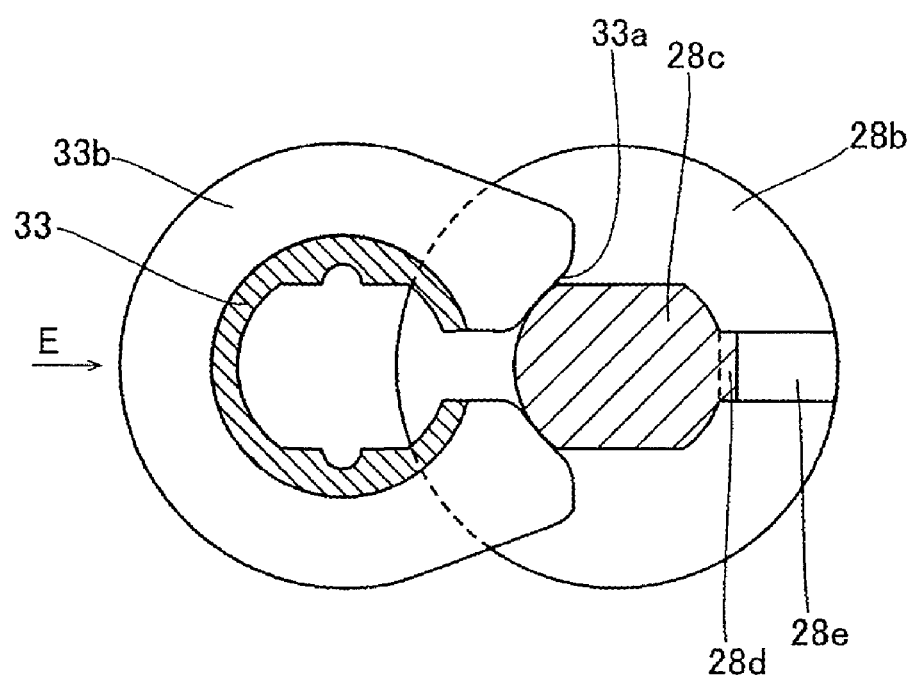

[Fig. 21]
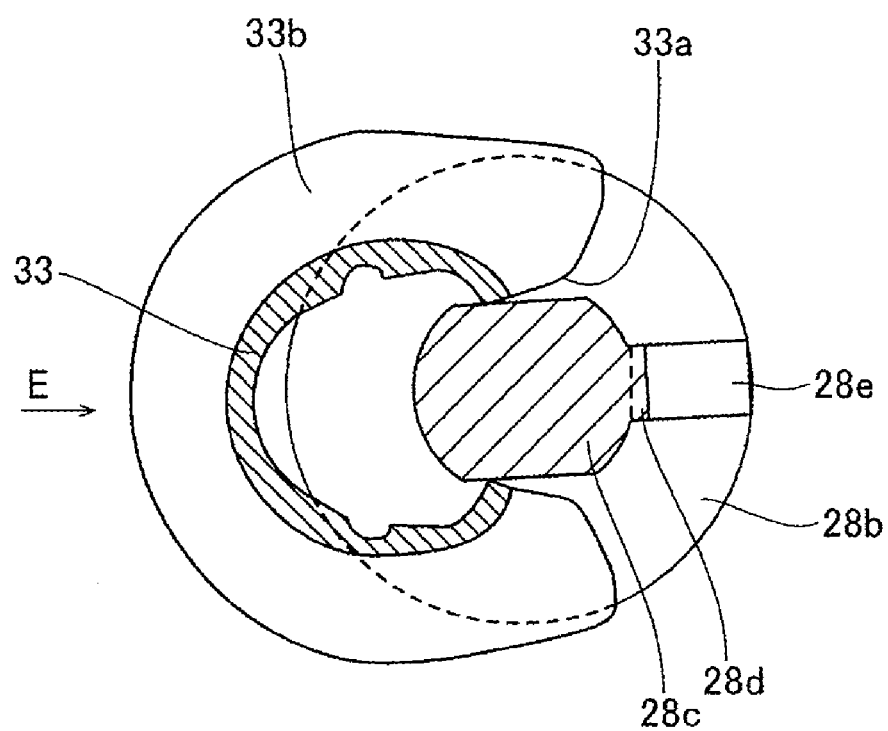

[Fig. 22]
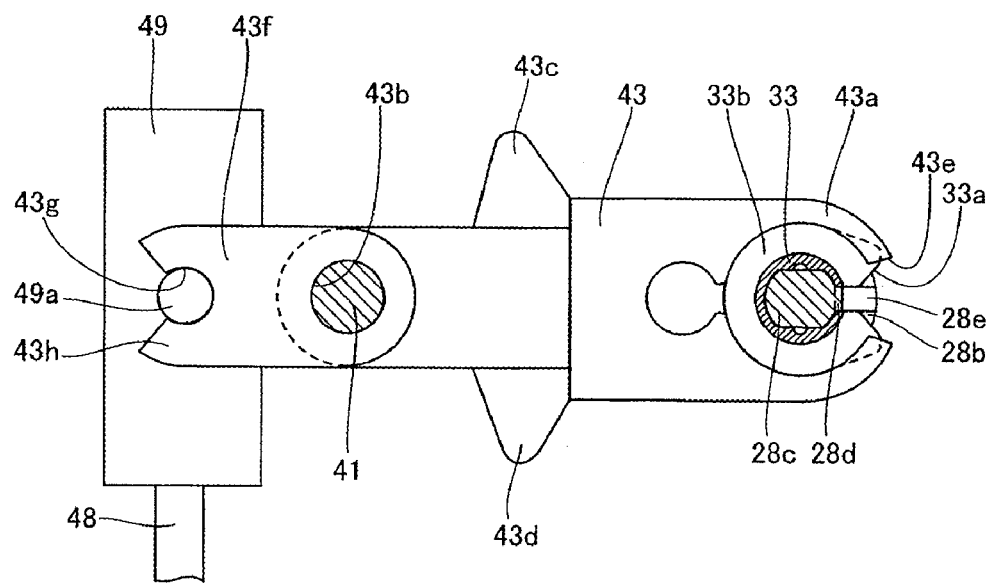

[Fig. 23]
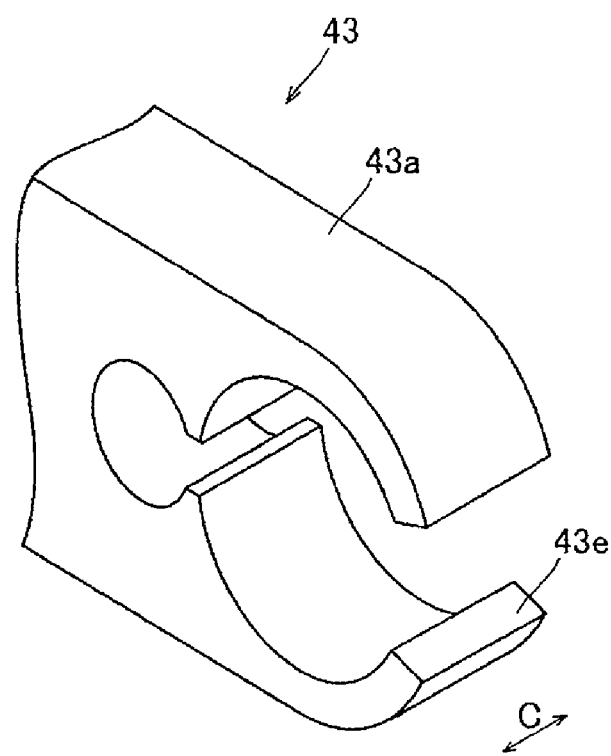

[Fig. 24]
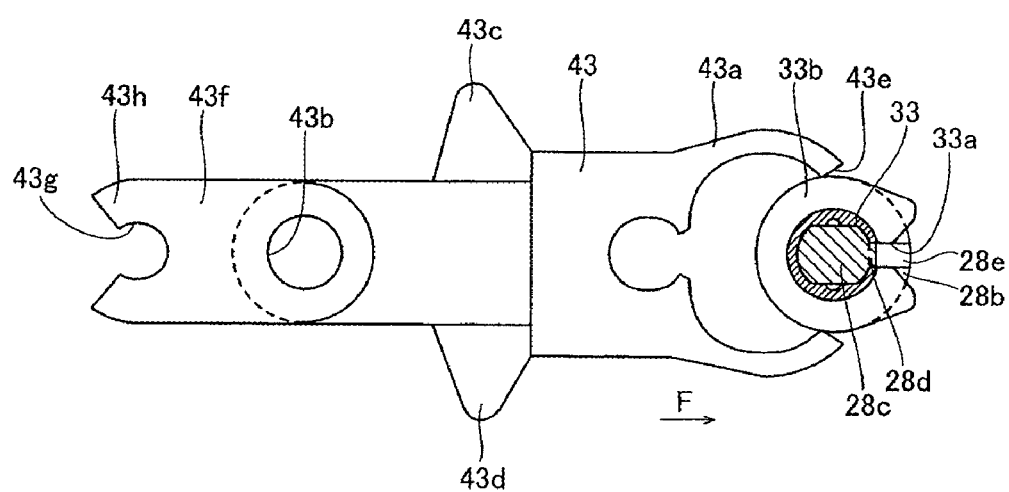

[Fig. 25]
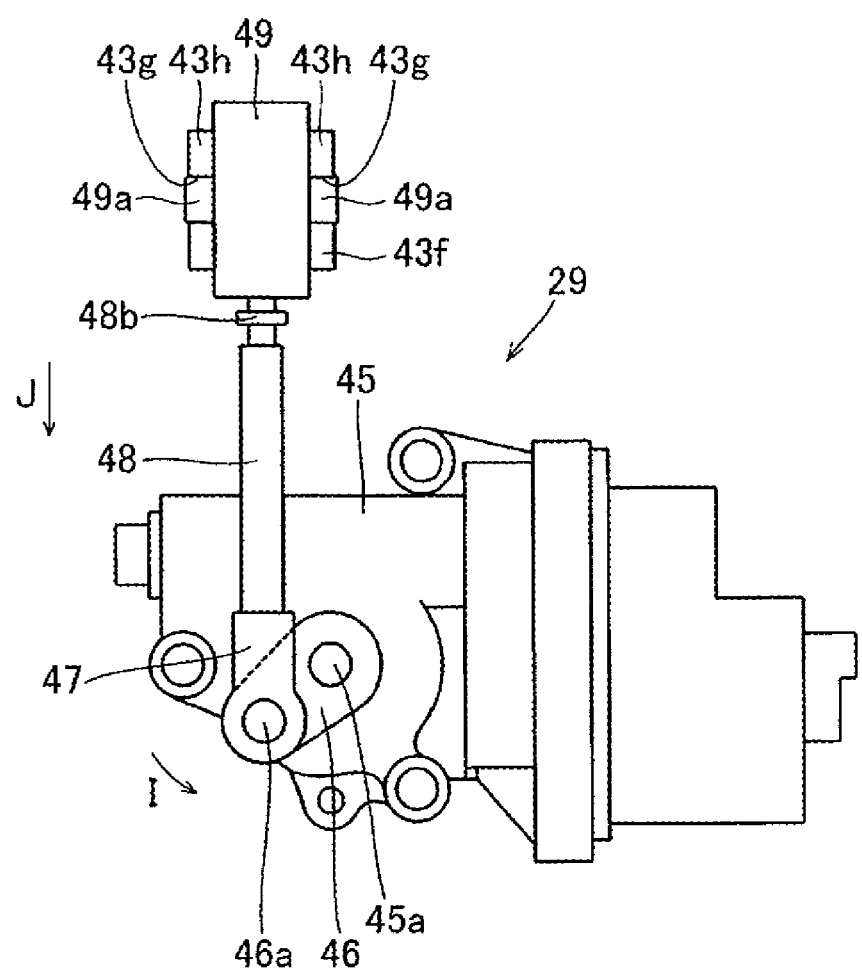

[Fig. 26]
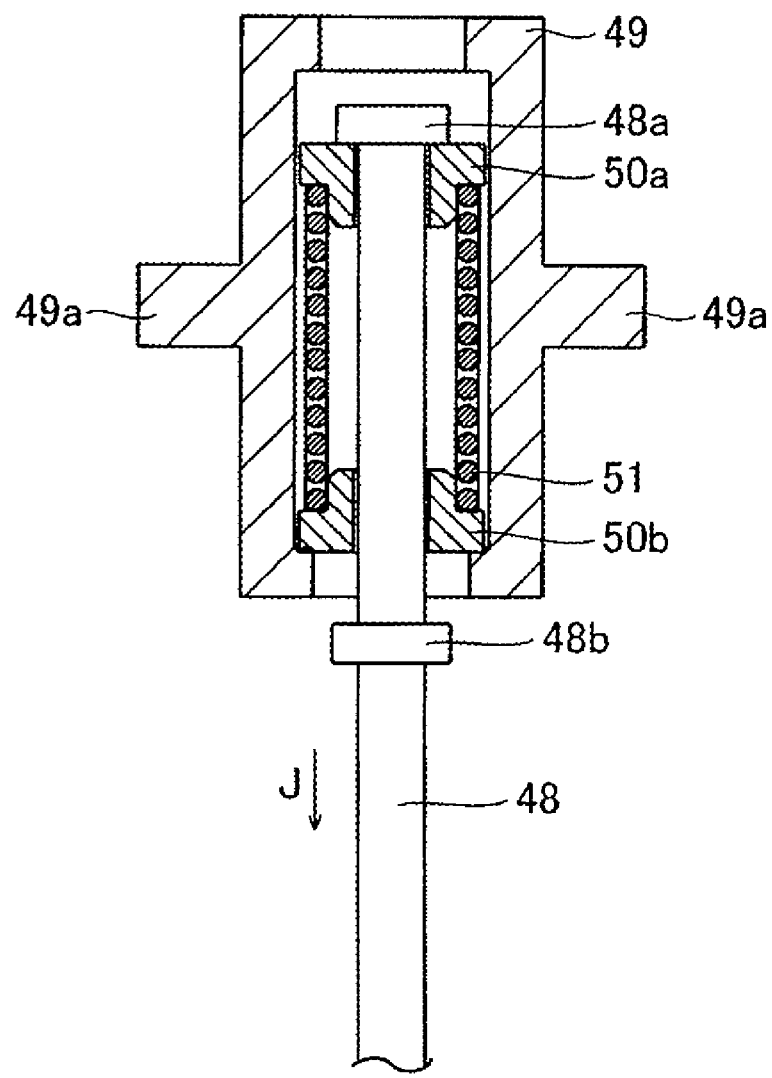

[Fig. 27]
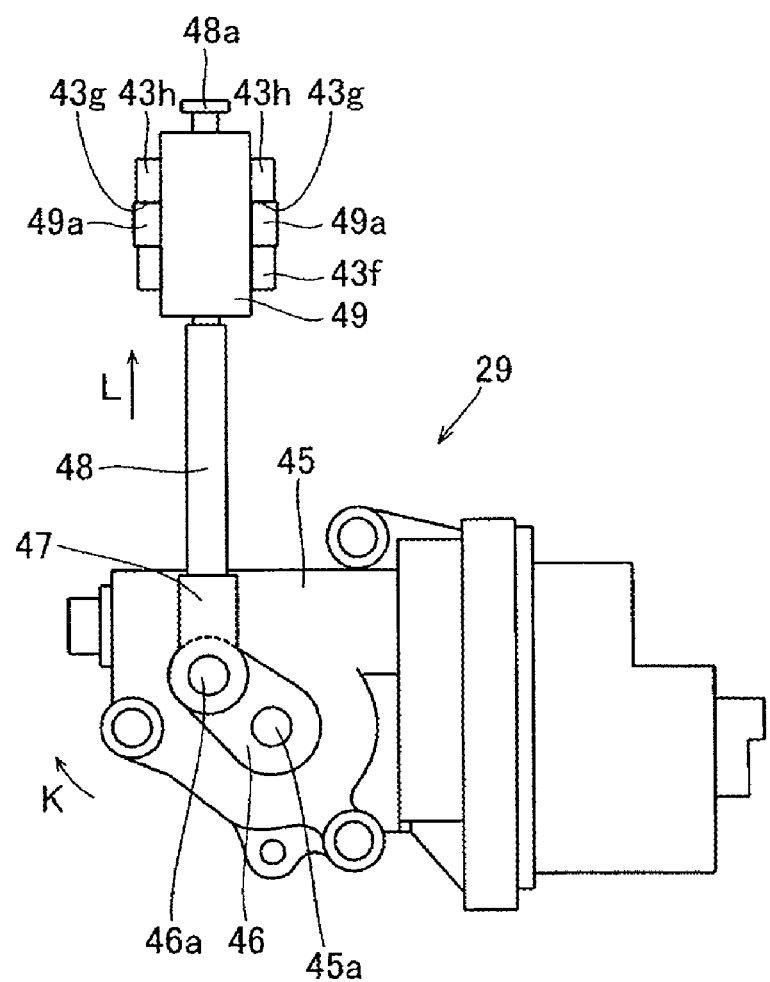

[Fig. 28]
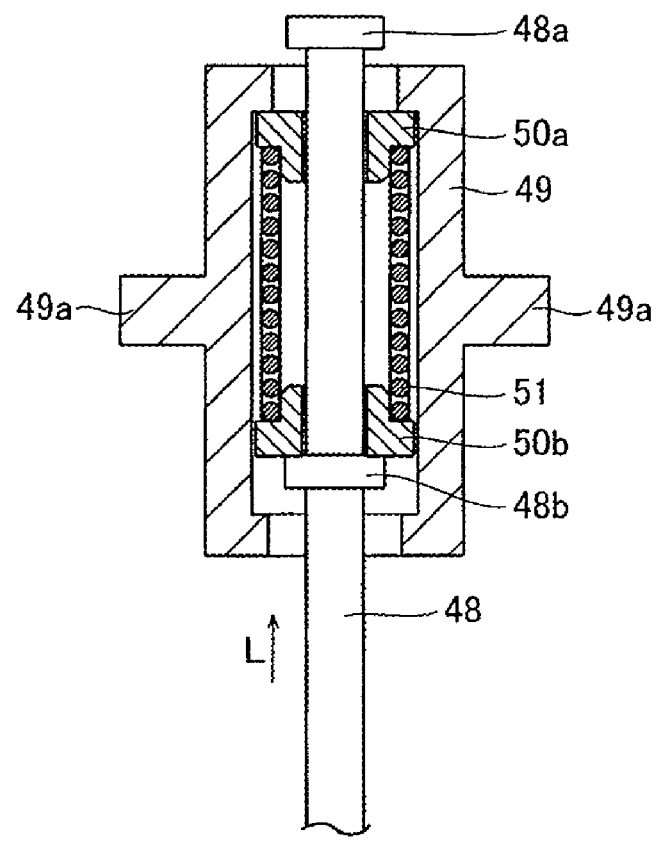

[Fig. 29]
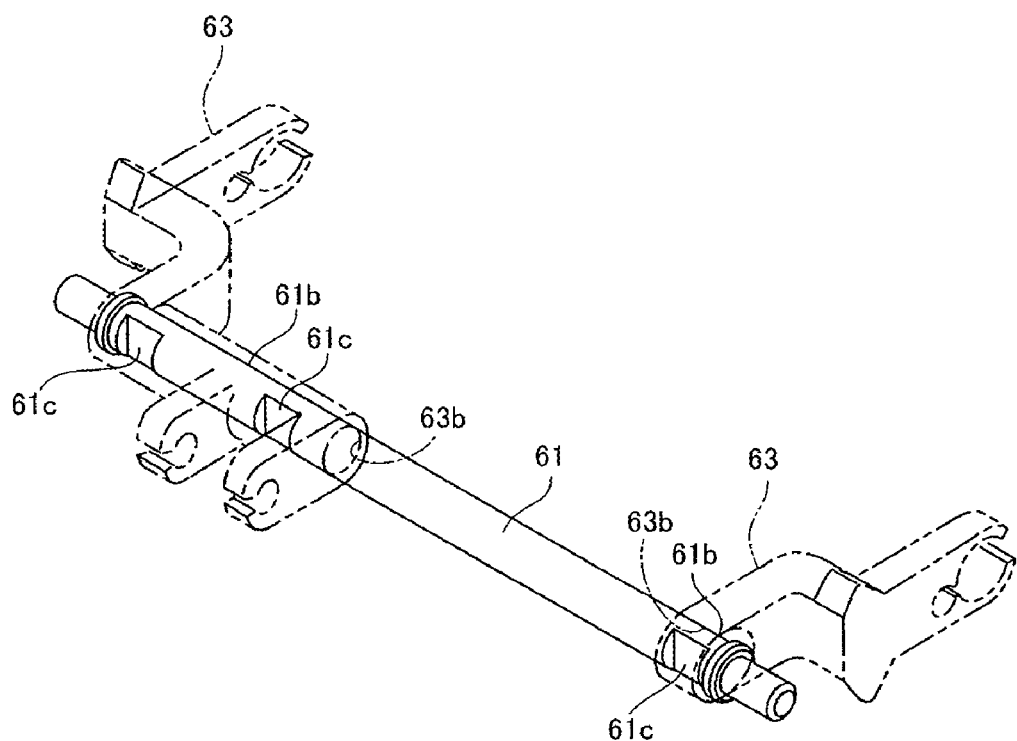

[Fig. 30]
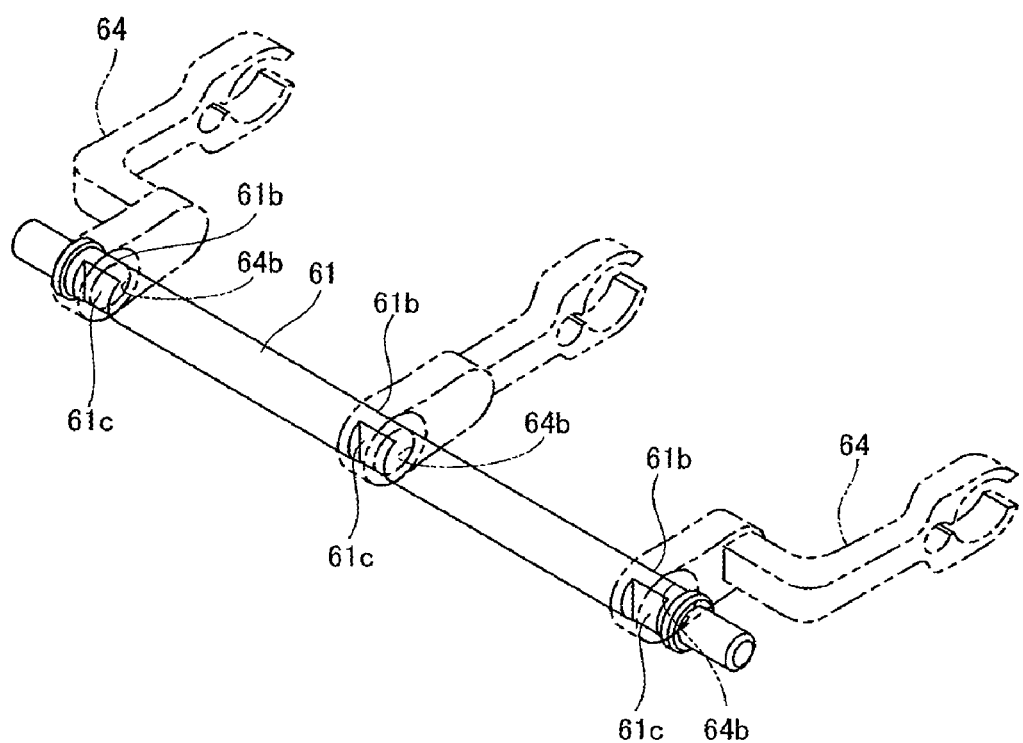

[Fig. 31]
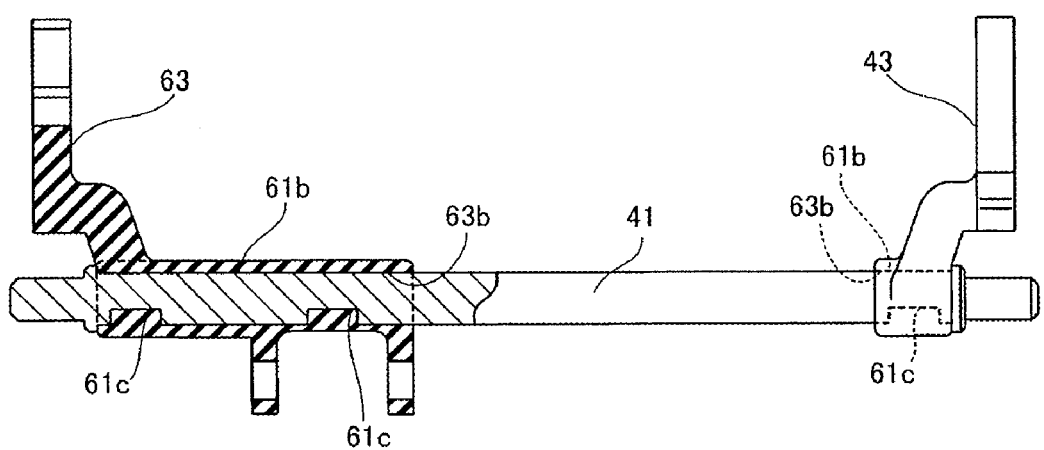

[Fig. 32]
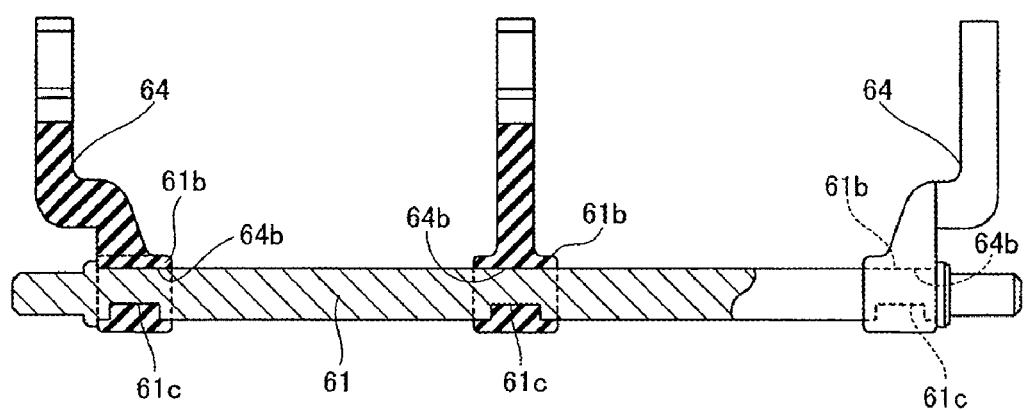

[Fig. 33]
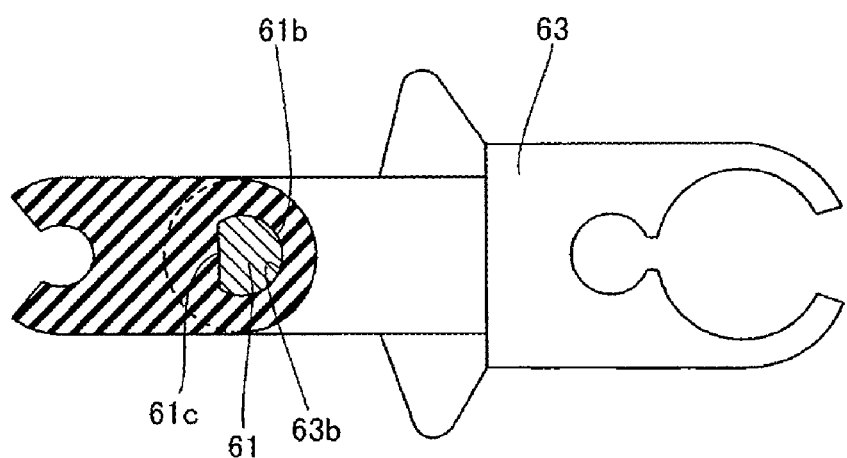

[Fig. 34]
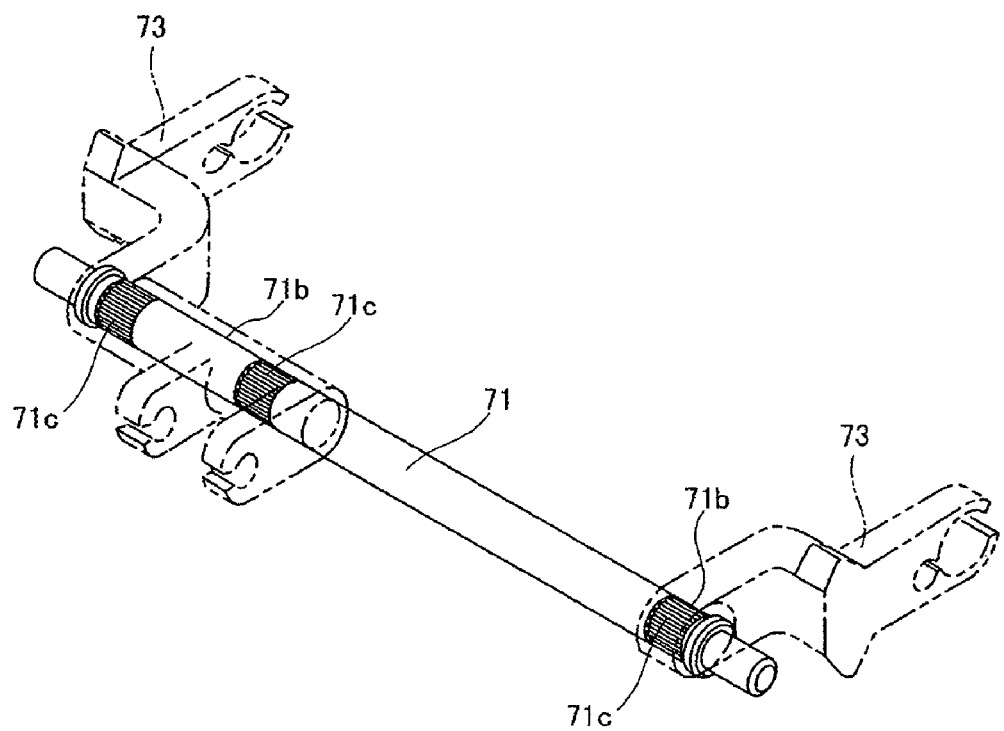

[Fig. 35]
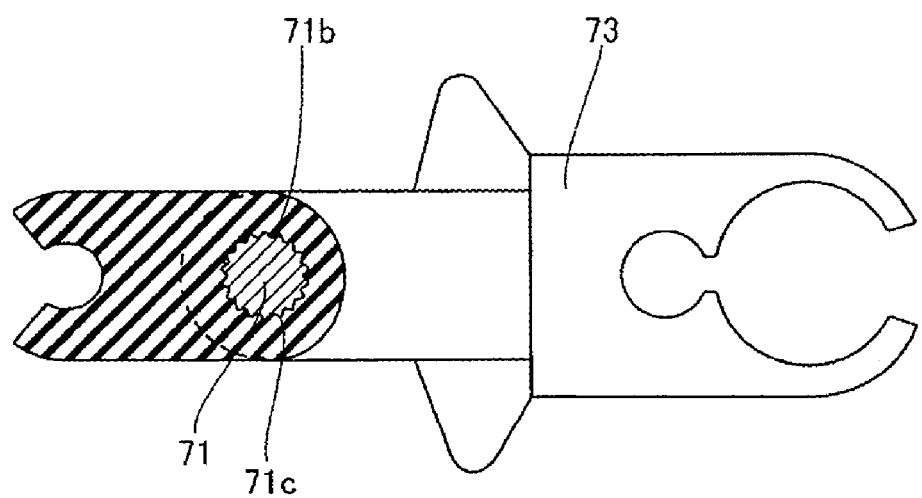

[Fig. 36]
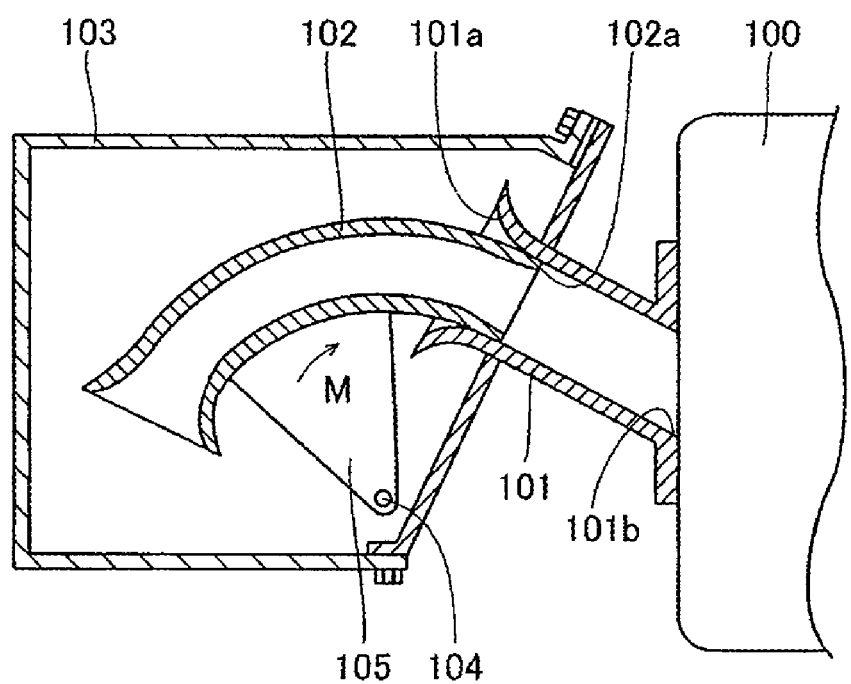
PRIOR ART

[Fig. 37]
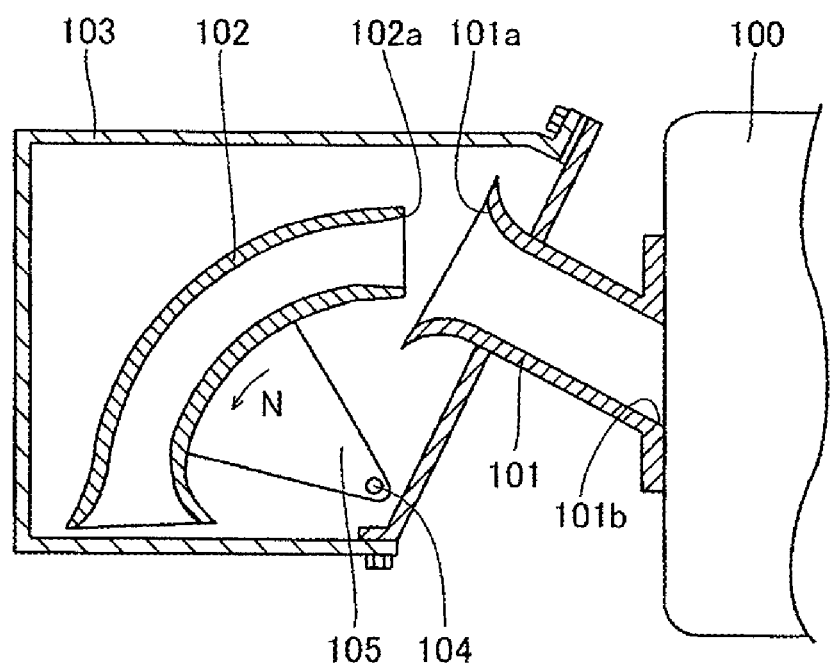
PRIOR ART

ENGINE AIR INTAKE ARRANGEMENT FOR A VEHICLE

RELATED APPLICATIONS

This application claims priority from Japanese Patent Application Nos. 2006-253638, filed Sep. 20, 2006, and 2006-009139, filed Jan. 17, 2006, the entireties of which are incorporated by reference herein. This application is also related to U.S. application Ser. Nos. 11/623,700 and 11/623,698, filed on even date herewith, and entitled ENGINE AIR INTAKE ARRANGEMENT FOR A VEHICLE, the entireties of which are incorporated by reference herein.

BACKGROUND OF THE INVENTION

1. Field of the Invention

The present invention relates to a vehicle, and more particularly, to a vehicle provided with a funnel through which the air is delivered to an intake port of an engine.

2. Description of the Related Art

It is conventional for vehicles, such as motorcycles, for example, to be provided with a funnel through which the air is delivered to an intake port of an engine. For example, Japanese Patent Publication No. 09-100720 discloses a motorcycle provided with an intake air funnel that is divided into two parts.

FIGS. 36 and 37 are cross sectional views illustrating a construction of a funnel similar to that disclosed in Japanese Patent Publication No. 09-100720. With reference to FIG. 36, a funnel of the motorcycle includes a stationary funnel 101 and a movable funnel 102. The stationary funnel 101 is fixed to an air cleaner box, or intake air box 103, to which the air purified by an air filter (not shown) is supplied. An inlet 101a end portion of the stationary funnel 101 is arranged in the cleaner box 103 and an outlet 101b end portion is connected to an intake port (not shown) on which an intake valve of an engine 100 is arranged.

The movable funnel 102 is arranged in the air cleaner box 103 so as to be movable in the air cleaner box 103. Specifically, the movable funnel 102 is supported in the air cleaner box 103 by a single turning lever 105, which rotates about a support shaft 104. Therefore, as shown in FIG. 36, in the event that the turning lever 105 is turned in a direction identified by the arrow M, an outlet 102a of the movable funnel 102 is moved toward the inlet 101a of the stationary funnel 101. On the other hand, as shown in FIG. 37, in the event that the turning lever 105 is rotated in a direction identified by the arrow N, the outlet 102a of the movable funnel 102 is moved away from the inlet 101a of the stationary funnel 101.

The operation of the two-part intake air funnel is described with reference to FIGS. 36 and 37. First, when the engine 100 rotates at low speeds, an intake pipe connected to the engine 100 from the air cleaner box 103 is lengthened in order to attain a desired pulsation effect of the air moving within the intake air funnel. As is known, the pulsation effect improves the intake efficiency through adjustment of the length of the overall intake passage to correspond the movement of high pressure waves within the intake passage to the rotational speed of the engine 100. That is, when the engine 100 rotates at low speeds, the outlet 102a of the movable funnel 102 is coupled to the inlet 101a of the stationary funnel 101 by rotating the turning lever 105 in the M direction, as shown in FIG. 36. Thereby, the intake passage leading to the engine 100 from the air cleaner box 103 is lengthened because the both the stationary funnel 101 and the movable funnel 102 make up the intake passage.

When the engine 100 rotates at high speeds, the intake passage leading to the engine 100 from the air cleaner box 103 is shortened facilitate obtaining a desired pulsation effect. That is, when the engine 100 rotates at high speeds, the outlet 102a of the movable funnel 102 is separated from the inlet 101a of the stationary funnel 101 by rotating the turning lever 105 in the N direction, as shown in FIG. 37. Thereby, the intake passage leading to the engine 100 from the air cleaner box 103 is made shortened because the intake passage is defined only by the stationary funnel 101.

SUMMARY OF THE INVENTION

One aspect of the present invention involves the realization by the present inventors that with constructions substantially similar to that disclosed in Japanese Patent Publication No. 09-100720 and FIGS. 36 and 37, the flow resistance of the air is increased when the movable funnel 102 is separated from the stationary funnel 101 (that is, when the engine 100 rotates at high speeds). Specifically, with such constructions, the single turning lever 105 rotates the movable funnel 102 such that outlet 102a end portion of the movable funnel 102 is inclined with respect to the inlet 101a end portion of the stationary funnel 101 when the movable funnel 102 is separated from the stationary funnel 101. Therefore, the air passing through the movable funnel 102 and passing into the stationary funnel 101 is bent in a flow direction, and the flow resistance of the air is increased. Consequently, when the movable funnel 102 is separated from the stationary funnel 101, there exists a decrease in intake efficiency.

An aspect of the present invention involves addressing the above-described problem and providing a vehicle having an engine air intake system that is capable of inhibiting a decrease in intake efficiency when a movable funnel is separated from a stationary funnel. Such a vehicle, in one aspect of the invention, includes an engine air intake system having a stationary funnel through which the air is led to an intake port of an engine. A movable funnel is movable supported on an inlet side of the stationary funnel and cooperates with the stationary funnel to deliver air to the intake port of the engine. A parallel linkage includes a plurality of linkage members that movably support the movable funnel relative to the stationary funnel.

Another aspect of the present invention is a vehicle, as described above, in which the parallel linkage is used to move the movable funnel to selectively separate an outlet end of the movable funnel from, or abut the outlet end of the movable funnel against, an inlet end of the stationary funnel while the outlet end of the movable funnel is maintained in parallel to the inlet end of the stationary funnel. Thereby, even when the outlet end of the movable funnel is separated from the inlet end of the stationary funnel, the air passing through the movable funnel and into the stationary funnel can be caused to flow substantially linearly, so that an increase in flow resistance of the air is inhibited. Consequently, when the movable funnel is separated from the stationary funnel, it is possible to inhibit a decrease in intake efficiency.

In another aspect of the present invention, preferably, in the case where the engine rotates at high speed, the linkage members rotate in a first direction whereby an outlet end of the movable funnel is moved to a first position separated from an inlet end of the stationary funnel, and in the case where the engine rotates at low speed, the linkage members rotate in a second direction opposition the first direction whereby the outlet of the movable funnel is moved to a second position to abut against the inlet end of the stationary funnel. With such a construction, in the case where a rotational speed of the engine is varied from low speed to high speed, it is possible to move the movable funnel to the first position from the second position while an outlet end of the movable funnel is maintained in a position substantially parallel to an inlet end of the stationary funnel. Thereby, in the case where the engine rotates at high speed, the air passing through the movable funnel and into the stationary funnel can be caused to flow linearly, so that it is possible to inhibit the air from being increased in flow resistance. Consequently, in the case where the engine rotates at high speed, it is possible to inhibit a decrease in intake efficiency.

In this case, preferably, the amount of rotation of the linkage members is adjusted so that an outlet end of the movable funnel in the first position and an outlet end of the movable funnel in the second position are positioned in the same manner as viewed in a direction in which the stationary funnel is opened (along the axis defined by the inlet of the stationary funnel). That is, the radial position of the outlet end of the movable funnel, relative to an axis defined by the inlet end of the stationary funnel, between the first and second positions are substantially the same. With such a construction, in the case where the movable funnel is moved to the first position from the second position (in the case where the engine rotates at high speed), substantially the entire volume of air passing through the movable funnel and into the stationary funnel flows linearly, so that it is possible to further inhibit the air from being increased in flow resistance.

In the construction described immediately above, preferably, the movable funnel comprises an upper movable shaft and a lower movable shaft and the stationary funnel comprises an upper stationary shaft and a lower stationary shaft. The upper movable shaft and the upper stationary shaft are connected to each other through an upper linkage member and the lower movable shaft and the lower stationary shaft are connected to each other through a lower linkage member. A position of the upper movable shaft in the first position, as viewed along the axis defined by the inlet of the stationary funnel, and a position of the upper movable shaft in the second position, as viewed in a direction in which the stationary funnel is opened, are the same, and a position of the lower movable shaft in the first position, as viewed in a direction in which the stationary funnel is opened, and a position of the lower movable shaft in the second position, as viewed along the axis defined by the inlet of the stationary funnel, are the same. That is, the respective radial positions of the upper and lower movable shafts, relative to the axis defined by the inlet end of the stationary funnel, are substantially the same in both the first and second positions. With such construction, in the case where the upper movable shaft of the movable funnel and the upper stationary shaft of the stationary funnel are connected to each other through the upper linkage member and the lower movable shaft of the movable funnel and the lower stationary shaft of the stationary funnel are connected to each other through the lower linkage member, the amount of rotation of the upper linkage member and the lower linkage member between the first and second position are adjusted whereby an outlet end of the movable funnel in the first position and an outlet end of the movable funnel in the second position can be positioned in the same manner as viewed along the axis defined by the inlet of the stationary funnel.

In this case, preferably, a position of the upper movable shaft in the first position, as viewed along the axis defined by the inlet of the stationary funnel, and a position of the lower movable shaft in the first position, as viewed along the axis defined by the inlet of the stationary funnel, are the same, and a position of the upper movable shaft in the second position, as viewed along the axis defined by the inlet of the stationary funnel, and a position of the lower movable shaft in the second position, as viewed along the axis defined by the inlet of the stationary funnel, are substantially the same. With such a construction, the rotation amounts of the upper linkage member and the lower linkage member are adjusted such that an outlet end of the movable funnel in the first position and an outlet end of the movable funnel in the second position can be readily positioned in the same manner as viewed along the axis defined by the inlet of the stationary funnel.

In the vehicle in one aspect, preferably, a support shaft (e.g., the upper or lower movable shafts) supported by the linkage members is provided integrally on the movable funnel and the linkage members comprise a fitting portion rotatably supporting the support shaft. With such construction, there is no need of subsequently mounting the support shaft to the movable funnel by fasteners, such as screws or the like, so that it is possible to inhibit parts such as screws, etc. from coming off and causing a failure. Also, since the movable funnel and the support shaft can be made as one integral part by providing the support shaft integrally on the movable funnel, it is possible to reduce the number of parts.

In certain arrangements, the engine includes a plurality of cylinders and a stationary funnel and a movable funnel are respectively provided on every cylinder of the engine. Each of the movable funnels is formed integral with at least one other movable funnel through the support shaft which connects the adjacent movable funnels. With such construction, by fitting the fitting portion of the linkage member onto the support shaft for connection between adjacent movable funnels, a plurality of movable funnels can be supported movably by the same linkage member. Thereby, the linkage members can be reduced in number as compared with the case where a linkage member is provided on every movable funnel. Also, since a plurality of movable funnels can be made one part by forming adjacent movable funnels integrally through the support shaft for connection between the adjacent movable funnels, it is possible to reduce the number of parts.

In the construction described in the immediately preceding paragraph, preferably, there is further provided a bushing mounted to the support shaft to permit the linkage members to turn relative to the support shaft. The bushing includes a first split extending in an axial direction (relative to the support shaft) and is elastically deformable so that a split width of the first split can be increased. With such construction, even when it is difficult or impossible to mount the bushing to the support shaft by sliding the bushing axially on the support shaft due to integral formation of the support shaft between the adjacent movable funnels, the bushing can be fitted onto the support shaft through the first split by elastically deforming the bushing so that a split width of the first split is increased.

In at least one arrangement, the support shaft includes a rib that engages the first split of the bushing. With such construction, the rib of the support shaft and the first split of the bushing engage with each other when the bushing is mounted to the support shaft, whereby it is possible to inhibit the bushing from rotating relative to the support shaft. Thereby, the bushing can be readily mounted to the support shaft. In at least one arrangement, the bushing includes a radial flange portion that defines a tapered opening to the first split. With such construction, the bushing can be readily and elastically deformed so that a split width of the first split is increased by pushing the bushing radially of the support shaft while the flange portion of the bushing is caused to abut against the support shaft.

In one arrangement of the construction described in the immediately preceding paragraph, the support shaft includes a reduced-diameter portion to which the bushing is mounted.

The rib of the support shaft comprises a first rib portion and a second rib portion. The first rib portion is formed on an outer surface of the reduced-diameter portion to extend axially on the support shaft and the second rib portion is formed on an end of the reduced-diameter portion to extend radially relative to an axis of the support shaft. With such construction, since the second rib portion of the support shaft can be caused to engage with the first split positioned on the flange portion of the bushing, it is possible to further inhibit the bushing from rotating relative to the support shaft.

In a construction in which each of the movable funnels are formed integrally through the support shaft which connects each movable funnel with at least one other movable funnel, preferably, the fitting portions of the linkage members include a second axial split that is elastically deformable so that a split width of the second split is increased. With such construction, even when it becomes difficult to mount the fitting portion of the linkage member axially of the support shaft due to integral formation of the support shaft between the adjacent movable funnels, the fitting portion can be fitted onto the support shaft through the second split radially of the support shaft by elastically deforming the fitting portion so that a split width of the second split of the fitting portion of the linkage member is increased.

In one aspect of the present invention, the vehicle includes a rotating shaft (e.g., the upper or lower stationary shafts) to rotate the linkage members. The linkage members are provided with a rotating shaft support hole into which the rotating shaft is inserted, so that the linkage members turn together with the rotating shaft. A strut is provided integrally on the stationary funnel to support an end of the rotating shaft rotatably so that the rotating shaft is not movable axially. With such construction, it is possible to inhibit generation of an inconvenience that the end of the rotating shaft comes off the rotating shaft support hole of the strut while the stationary funnel is fixed to a predetermined member, due to movements of the rotating shaft supported by the strut in an axial direction of the rotating shaft. Thereby, since the rotating shaft is kept inserted into the rotating shaft insertion hole of the linkage member in a state that the stationary funnel is fixed to the predetermined member, it is possible to inhibit the linkage member from coming off the end of the rotating shaft.

In a construction as described in the immediately preceding paragraph, preferably, the rotating shaft comprises a step to abut against a surface of the strut that defines the rotating shaft support hole. With such construction, the step on the rotating shaft abuts against the strut whereby it is possible to readily inhibit the rotating shaft, which is supported by the strut, from moving axially.

In a construction in which the movable funnel is moved in the first direction and in the second direction, preferably, the linkage members include a first stop to abut against an abutment surface to restrict turning of the linkage members in the first direction to define the first position of the movable funnel, and a second stop to abut against the abutment surface to restrict turning of the linkage members in the second direction to define the second position of the movable funnel. With such a construction, when the movable funnel is moved to the first position, it is possible to inhibit the inconvenience that the movable funnel moves beyond the first position, due to an excessive turning amount of the linkage member in the first direction. Also, it is possible to inhibit the inconvenience that the movable funnel moves to a position beyond the second position due to an excessive turning amount of the linkage member in the second direction.

In the construction described in the immediately preceding paragraph, preferably, a moving member is provided to move the linkage members and a biasing member is provided to bias the moving member. A biasing force of the biasing member is transmitted to the linkage members through the moving member whereby the linkage members are turned, in the case where turning of the linkage members in the first direction causes the first stop to abut against the abutment surface, a biasing force of the biasing member is transmitted to the linkage members through the moving member in a direction tending to rotate the linkage members in the first direction. Furthermore, when turning of the linkage members in the second direction causes the second stop to abut against the abutment surface, a biasing force of the biasing member is transmitted to the linkage members through the moving member in a direction tending to rotate the linkage members in the second direction. In other words, the moving member and the biasing member create a "lost motion" device, which maintains the first or second stops against the abutment surface due to the biasing force of the biasing member. With such construction, in the case where the linkage member turns in the first direction to cause the first stop to abut against an abutment surface (in the case where the movable funnel reaches the first position), a state, in which the first stop on the linkage member abuts against the abutment surface, can be held by the biasing force of the biasing member. Thereby, it is possible to inhibit the movable funnel from being moved to a position shifted from the first position when the movable funnel is desired to be held in the first position. Also, when the linkage member rotates in the second direction to cause the second stop to abut against the abutment surface (in the case where the movable funnel reaches the second position), the second stop on the linkage member is kept abutted against the abutment surface by the biasing force of the biasing member. Thereby, it is possible to inhibit the movable funnel from being moved to a position shifted from the second position when the movable funnel is to be held in the second position. In such a construction, preferably, the abutment surface is defined by a strut provided integrally on the stationary funnel. With such construction, parts can be reduced in number as compared with the case where an abutment surface is provided by a separate member.

In the vehicle in one aspect, preferably, the stationary funnel comprises a fastener insertion hole into which a fastener, such as a screw, is inserted. The stationary funnel is mounted to the engine by the screw inserted into the screw insertion hole. The screw insertion hole of the stationary funnel is provided on an inner surface thereof with an engagement portion which is structured to engage with a head of the screw and to be elastically deformable toward an outside of the screw insertion hole from an inside thereof to permit the head of the screw to pass by the engagement portion. With such construction, engagement of the head of the screw with the engagement portion makes it possible to inhibit the screw from protruding from the screw insertion hole even when the stationary funnel is carried in a state that the screw is inserted into the screw insertion hole. Also, the engagement portion of the screw insertion hole is structured to be elastically deformable toward an outside of the screw insertion hole from an inside thereof whereby in mounting the stationary funnel to the engine, engagement of the head of the screw with the engagement portion can be released by elastically deforming the engagement portion of the screw insertion hole. Thereby, it is possible to readily mount the stationary funnel to the engine by way of the screw inserted into the screw insertion hole.

In the vehicle in one aspect, preferably, there is further provided an elastic, or resilient, member mounted to an outlet end of the movable funnel. With such construction, in the case where the opening of the movable funnel toward the stationary funnel is caused to abut against the opening of the stationary funnel on the intake side, the elastic member mounted to the end of the movable funnel toward the stationary funnel can fill the clearance between the movable funnel and the stationary funnel. Thereby, it is possible to inhibit the air from leaking from between the movable funnel and the stationary funnel.

In the vehicle in one aspect, preferably, there is further provided a rotating shaft which turns the plurality of linkage members, the rotating shaft is made of a metal, the plurality of linkage members are made of a resin, and the rotating shaft made of a metal and the plurality of linkage members made of a resin are formed integrally. With such construction, the rotating shaft made of a metal enables readily ensuring stiffness for the rotating shaft and the linkage members made of a resin enable readily and elastically deforming of the linkage members, to ease assembly, for example, as described above.

In this case, preferably, the rotating shaft made of a metal is shaped not to rotate at joints with the plurality of linkage members made of a resin. With such construction, it is possible to inhibit the linkage members from idling relative to the rotating shaft, so that it is possible to inhibit generation of dispersion in movements of the movable funnel due to rotation of the linkage members relative to the rotating shaft. In such an arrangement, preferably, the rotating shaft is shaped in the form of a round rod and the joint at which the rotating shaft in the form of a round rod joins the linkage member includes a flat surface portion. With such construction, the flat surface portion enables readily inhibiting the linkage members from idling relative to the rotating shaft. In another arrangement, the rotating shaft may be shaped in the form of a round rod and the joint at which the rotating shaft in the form of a round rod joins the linkage member includes an irregular portion provided along an outer periphery of the rotating shaft. With such construction, the plurality of irregular portions enable readily inhibiting the linkage members from idling relative to the rotating shaft.

In a vehicle in which the rotating shaft and the plurality of linkage members are formed integrally, preferably, there is further provided an air cleaner box in which the stationary funnel and the movable funnel are arranged. An air filter is positioned in the air cleaner box to filter the air led to the intake port of the engine. The parallel linkage including the rotating shaft and the plurality of linkage members is arranged downstream of the air filter. When the rotating shaft and the plurality of linkage members of the parallel link are formed integrally, the parallel link does not include removable parts such as screws, etc., so that it is possible to inhibit removable parts such as screws, etc. from dropping on the engine.

In one aspect of the vehicle, preferably, a plurality of the movable funnels are connected to constitute a funnel portion and the linkage members are arranged to support the plurality of funnel portions substantially at its center of gravity. With such a construction, unlike the case where the points on the linkage member at which the plurality of funnel portions are supported are not positioned at the center of gravity of the plurality of funnel portions, it is possible to restrict the twist of the funnel portions, due to the weight of the respective movable funnels, relative to those points on the linkage member at which the plurality of funnel portions are supported so that the funnel portions can be smoothly moved.

BRIEF DESCRIPTION OF THE DRAWINGS

These and other features, aspects and advantages of the present invention are described with reference to drawings of preferred embodiments, which are intended to illustrate, and not to limit, the present invention. The drawings contain thirty-seven (37) figures, in which FIGS. 36 and 37 illustrate a prior art construction.

FIG. 1 is a side view of a motorcycle having certain features, aspects and advantages of the present invention.

FIG. 2 is a plan view of the area of the engine air intake funnels of the motorcycle of FIG. 1.

FIG. 3 is a side view of the area of the funnels of the motorcycle of FIG. 1.

FIG. 4 is a front view of the funnels of the motorcycle shown in FIG. 1.

FIG. 5 is a perspective view of movable funnels of the motorcycle of FIG. 1 in a separated position relative to stationary funnels.

FIG. 6 is a side view of the movable funnels of the motorcycle shown in FIG. 1 in the separated position.

FIG. 7 is a perspective view of the movable funnels of the motorcycle shown in FIG. 1 in an abutting position relative to the stationary funnels.

FIG. 8 is a side view of the movable funnels of the motorcycle shown in FIG. 1 in the abutting position.

FIG. 9 is a plan view of the funnels of the motorcycle shown in FIG. 1.

FIG. 10 is a perspective view of a stationary funnel of the motorcycle shown in FIG. 1, separated from the remainder of the motorcycle.

FIG. 11 is a front view of the stationary funnel shown in FIG. 10.

FIG. 12 is a cross sectional view illustrating the construction of a fastener insertion hole of the stationary funnel shown in FIGS. 10 and 11.

FIG. 13 is a cross sectional view illustrating the construction of a screw insertion hole of the stationary funnel shown in FIGS. 10 and 11.

FIG. 14 is a front view of the movable funnels of the motorcycle shown in FIG. 1, separated from the remainder of the motorcycle.

FIG. 15 is a perspective view showing the construction of a support shaft for the movable funnels shown in FIG. 14.

FIG. 16 is a plan view showing the construction of the support shaft of FIG. 15.

FIG. 17 is a side view illustrating a split bushing used in the motorcycle shown in FIG. 1 and assembled onto the support shaft.

FIG. 18 is a cross sectional view of the split bushing of FIG. 17.

FIG. 19 is a perspective view showing the split bushing of FIG. 17.

FIG. 20 is a side view showing the split bushing of FIG. 17 in a first position during assembly to the support shaft.

FIG. 21 is a side view showing the split bushing of FIG. 17 in a second position during assembly to the support shaft.

FIG. 22 is a side view showing a parallel linkage used in the motorcycle shown in FIG. 1.

FIG. 23 is a perspective view illustrating the structure of a fitting portion of the parallel linkage shown in FIG. 22.

FIG. 24 is a side view showing the parallel link used in the motorcycle shown in FIG. 1.

FIG. 25 is a front view of a funnel moving mechanism of the motorcycle shown in FIG. 1.

FIG. 26 is a cross sectional view showing the construction of moving members of the funnel moving mechanism shown in FIG. 25.

FIG. 27 is a front view showing the funnel moving mechanism of the motorcycle shown in FIG. 1.

FIG. 28 is a cross sectional view illustrating the construction of the moving members of the funnel moving mechanism shown in FIG. 27.

FIG. 29 is a perspective view illustrating details of the construction of a parallel linkage of a modification of the construction shown in the previous figures.

FIG. 30 is a perspective view illustrating details of the construction of the parallel linkage of FIG. 29.

FIG. 31 is a partial cross sectional view illustrating details of the construction of the parallel linkage of FIG. 29.

FIG. 32 is a partial cross sectional view illustrating details of the construction of the parallel linkage of FIG. 29.

FIG. 33 is a view illustrating details of the construction of the parallel linkage of FIG. 29.

FIG. 34 is a perspective view illustrating details of the construction of the parallel linkage according to a modification of the parallel linkage of FIG. 29.

FIG. 35 is a view illustrating details of the construction of the parallel linkage of FIG. 34.

FIG. 36 is a cross sectional view illustrating the construction of a funnel of a prior art motorcycle in an abutment position.

FIG. 37 is a cross sectional view illustrating the construction of a funnel of a prior art motorcycle in a separated position.

DETAILED DESCRIPTION OF THE PREFERRED EMBODIMENT

FIG. 1 is a side view showing the whole construction of a motorcycle according to a first embodiment of the invention. FIGS. 2 to 28 are views illustrating, in detail, the construction of a funnel of the motorcycle according to the first embodiment, shown in FIG. 1. First, the construction of the motorcycle according to the first embodiment of the invention is described with reference to FIGS. 1 to 28.

In the construction of the motorcycle according to the first embodiment of the invention, a front end of a main frame 2 is connected to a head pipe 1 as shown in FIG. 1. The main frame 2 is arranged so as to branch and extend left and right toward the front of a vehicle as shown in FIG. 2. The main frame 2 is formed so as to extend rearwardly and downward as shown in FIG. 1. Also, a seat rail 3 is connected to the main frame 2 to extend rearwardly and upward. A steering mechanism portion 4 is mounted to the head pipe 1 to be rotatable. A handle 5 is mounted to an upper side of the steering mechanism portion 4. A clutch lever 6 is mounted to the handle 5. Also, a front fork 7 is mounted to a lower side of the steering mechanism portion 4. A front wheel 8 is mounted rotatably to a lower end of the front fork 7.

A front end of a swing arm 10 is mounted to a rear end of the main frame 2 through a pivot shaft 9. A rear wheel 11 is mounted rotatably to a rear end of the swing arm 10. A fuel tank 12 is arranged above the main frame 2 and a seat 13 is arranged above the seat rail 3. Also, an engine 14 is arranged below the main frame 2.

The engine 14 comprises, as shown in FIG. 3, a piston 15, a cylinder 16, a cylinder head 17, and a throttle body 18. The piston 15 is fitted into the cylinder 16 and the cylinder head 17 is arranged so as to close one of the openings of the cylinder 16. Also, the cylinder head 17 is formed with an intake port 17a and an exhaust port 17b. The intake port 17a is provided to permit a mixture of an air and a fuel to be supplied to a combustion chamber 16a of the cylinder 16. The exhaust port 17b is provided to permit residual gases after combustion to be discharged from the combustion chamber 16a of the cylinder 16. An intake valve 19a and an exhaust valve 19b, respectively, are arranged in the intake port 17a and the exhaust port 17b. The throttle body 18 is mounted to an opening of the intake port 17a. Also, an injector 20 is mounted to the throttle body 18 to provide a jet of fuel into the intake port 17a. An exhaust pipe 21 is mounted to an opening of the exhaust port 17b and a muffler 22 (see FIG. 1) is connected to the exhaust pipe 21. While FIG. 3 shows only one cylinder 16, preferably multiple cylinders, and more preferably four cylinders 16, are actually arranged at predetermined intervals in a vehicle body width direction. That is, the engine 14 according to the first embodiment of the invention comprises four cylinders.

As shown in FIG. 1, a front cowl 23 including an upper cowl 23a and a lower cowl 23b is provided so as to cover a front side of a vehicle. An intake hole 23c is provided on a front side of the lower cowl 23b. While FIG. 1 shows only the intake hole 23c on the left in a vehicle body forward direction, preferably, a pair of intake holes 23c is actually arranged symmetrically with respect to the vehicle body forward direction. Also, air ducts 24 are connected to the intake holes 23c of the lower cowl 23b. Also, as shown in FIGS. 1 and 2, an air cleaner box 25, to which the air from the air ducts 24 is supplied, is arranged between the left-right branching main frame 2. As shown in FIGS. 2 and 3, an air filter 26 is arranged in the cleaner box 25 to purify the air supplied from the air ducts 24. Note that the air cleaner box 25 is an example of a "casing portion."

As shown in FIGS. 2 to 4, provided in the air cleaner box 25 are stationary funnels 27, movable funnels 28, and a funnel moving mechanism 29. The stationary funnels 27 and the movable funnels 28, respectively, are provided on every cylinder 16 of the engine 14. Also, the stationary funnels 27 are fixed to the air cleaner box 25 and have a function of leading the purified air in the air cleaner box 25 to the intake port 17a. Also, the movable funnels 28 are arranged on intake sides, or inlet sides, of the stationary funnels 27 and have a function of cooperating with the stationary funnels 27 to lead the purified air in the air cleaner box 25 to the intake port 17a.

Also, as shown in FIGS. 5 to 8, the movable funnels 28 are structured to be movable between a separated position (states shown in FIGS. 5 and 6), in which an outlet opening end 28a of the movable funnels 28 are separated from inlet end 27a of the stationary funnels 27, and an abutting position (states shown in FIGS. 7 and 8), in which the outlet end 28a of the movable funnels 28 abut against the inlet end 27a of the stationary funnels 27. Here, as shown in FIG. 3, in the case where the movable funnels 28 are moved to the separated position (states shown in FIGS. 5 and 6), intake passages connecting the cylinders 16 to the air cleaner box 25 comprise the stationary funnel 27, the throttle body 18, and the intake port 17a. On the other hand, in the case where the movable funnels 28 are moved to the abutting position (states shown in FIGS. 7 and 8), intake passages connecting the cylinders 16 to the air cleaner box 25 comprise the movable funnel 28, the stationary funnel 27, the throttle body 18, and the intake port 17a. Also, the funnel moving mechanism 29 functions to move the movable funnels 28 between the separated position and the abutting position. Note that the separated position and the abutting position, respectively, are examples of "first position" and "second position" of the movable funnels 28.

Also, as shown in FIGS. 9 to 11, the stationary funnels 27 are constructed such that two adjacent stationary funnels 27 are formed integral with each other through a connection 27b. That is, according to the first embodiment of the invention, two parts 30 are provided in which two adjacent stationary funnels 27 are made unitary. Also, the parts 30, in which two adjacent stationary funnels 27 are made unitary, respectively, are provided with three fastener insertion holes 27c, into which fasteners, such as screws 31 (see FIG. 12) are inserted. Hereinafter, the fastener insertion holes 27c are referred to as screw insertion holes 27c and the fasteners referred to as screws 31; however it will be understood that the holes 27c may be adapted any suitable type of fastener. As shown in FIG. 12, the stationary funnels 27 (the parts 30) together with the air cleaner box 25 are mounted to the throttle body 18 by means of the screws 31 inserted into the screw insertion holes 27c. In addition, the air cleaner box 25 is also provided with screw insertion holes 25a, into which screws 31 are inserted.

An engagement portion 27d is provided on an inner side of the screw insertion hole 27c of the stationary funnel 27 (the part 30) to engage with a head 31a of the screw 31 and to be elastically deformable toward an outside of the screw insertion hole 27c from an inside thereof. The engagement portion 27d is arranged so that it engages with the head 31a of the screw 31 in a position in which the tip end 31b of the screw 31 does not protrude outside the air cleaner box 25. In the case where an external force is applied on the screw 31 in an A direction in a state shown in FIG. 13, the engagement portion 27d is elastically deformed in a B direction whereby the screw 31 is moved in the A direction, so that the tip end 31b of the screw 31 is caused to project outside the air cleaner box 25. Also, as shown in FIGS. 9 to 11, a strut 27e is provided integrally on the part 30 in which two stationary funnels 27 are made unitary. The strut 27e is formed with a pair of rotating shaft support holes 27f by which ends of rotating shafts 41 described later are supported rotatably. In addition, the strut 27e is an example of "abutment member" which defines an "abutment surface."

The movable funnels 28 are constructed such that two adjacent movable funnels 28 are formed integral with each other through a pair of support shafts 28b as shown in FIGS. 9 and 14. The support shafts 28b are referred to herein as "movable shafts" because they are carried by the movable funnels 28, as opposed to the stationary funnels. That is, according to the first embodiment, there are provided two parts 32 in which two adjacent movable funnels 28 are formed integral with each other. In addition, the parts 32 are examples of a "funnel portion." Also, the support shafts 28b are arranged between two movable funnels 28 of the part 32. That is, the support shafts 28b are structured to be positioned in the substantially on an axis that is generally parallel to the funnel passage and passes through the center of gravity of the part 32. In addition, a parallel linkage 42 described later supports the support shafts 28b whereby the movable funnels 28 (the parts 32) are held movably. Also, the support shafts 28b are formed with reduced-diameter portions, or small-diameter portions 28c, and the small-diameter portions 28c are formed with ribs 28d, 28e. As shown in FIGS. 15 and 16, the rib 28d is formed on an outer surface of the small-diameter portion 28c to extend axially (C direction) of the support shaft 28b and the ribs 28e are formed on both ends of the small-diameter portion 28c to extend radially (D direction) of the support shaft 28b. The rib 28d is an example of a "first or axial rib" and the rib 28e is an example of "second or radial rib."

Also, as shown in FIGS. 9 and 14, support shafts 28f having a small-diameter portion 28g are provided on outer sides of the part 32 in which two adjacent movable funnels 28 are formed integral with each other, and ribs 28h, 28i are formed on the small-diameter portion 28g of the support shaft 28f.

The ribs 28h, 28i, respectively, are the same in shape as the ribs 28d, 28e shown in FIGS. 15 and 16. That is, the rib 28h is formed on an outer surface of the small-diameter portion 28g to extend axially of the support shaft 28f and the rib 28i is formed on an end of the small-diameter portion 28g toward the movable funnel 28 to extend radially of the support shaft 28f. Also, a reinforcement rib 28j is provided between the two movable funnels 28 of the part 32. Also, as shown in FIG. 9, two parts 32, in each of which two adjacent movable funnels 28 are formed integral with each other, are arranged so that end surfaces of the small-diameter portions 28g of the respective support shafts 28f are opposed to each other.

As shown in FIGS. 9, 17, and 18, a split bushing 33 is mounted to the small-diameter portion 28c of the support shaft 28b of the movable funnel 28 (the part 32). The split bushing 33 functions to allow the parallel links 42 described later to rotate relative to the support shafts 28b. Note that the split bushing is an example of a "bushing." As shown in FIGS. 17 to 19, the split bushing 33 includes a split 33a extending axially (C direction) relative to the support shaft 28b and is structured to be elastically deformable so that a split width of the split 33a can be increased. Note that the split 33a is an example of "first split." Also, flange portion 33b is provided on both ends of the split bushing 33 to project radially (D direction) of the support shaft 28b and formed integral with the splits 33a. The splits 33a positioned on the flange portions 33b are formed so as to be increased in split width in a direction in which the flange portions 33b project. With the split bushing 33 structured in the manner described above, the split bushing 33 is pushed in an E direction in a state (state in FIG. 20) that the flange portions 33b of the split bushing 33 are caused to abut against the small-diameter portion 28c of the support shaft 28b, whereby there comes out a state that the small-diameter portion 28c of the support shaft 28b is interposed by the split 33a of the split bushing 33 as shown in FIG. 21. The split bushing 33 can be mounted to the small-diameter portion 28c of the support shaft 28b as shown in FIG. 17 by pushing the split bushing 33 further in the E direction from the state shown in FIG. 21.

As shown in FIGS. 17 and 18, in the state that the split bushing 33 is mounted to the small-diameter portion 28c of the support shaft 28b, the split 33a of the split bushing 33 engages with the rib 28d so as to interpose the rib 28d of the support shaft 28b, and the splits 33a positioned on the flange portions 33b engage with the ribs 28e of the support shaft 28b so as to interpose the rib 28e of the support shaft 28b.

Also, as shown in FIG. 9, the split bushing 33 described above is also mounted to the small-diameter portions 28g of the support shafts 28f positioned between the parts 32 in which the two adjacent movable funnels 28 are formed integral with each other. Note that only one split bushing 33 positioned between the parts 32 in which the two adjacent movable funnels 28 are formed integral with each other, is mounted so as to bridge the small-diameter portions 28g of the two support shafts 28f.

Also, according to the first embodiment, as shown in FIGS. 4 and 6, seal members, or rubber lips 34, are mounted to ends of the movable funnels 28 toward the stationary funnels 27. Note that, the rubber lip is an example of an "elastic or resilient seal member." The rubber lips 34 function to fill clearances between the movable funnels 28 and the stationary funnels 27 in the case where the movable funnels 28 are moved to the abutting position (state shown in FIG. 8).

As shown in FIGS. 6 and 8, the funnel moving mechanism 29 is constructed so as to move the movable funnels 28 between the separated position (state shown in FIGS. 5 and 6)

and the abutting position (state shown in FIGS. 7 and 8) with the use of the parallel linkage 42.

In one construction of the funnel moving mechanism 29, as shown in FIGS. 9 to 11, ends of the rotating shafts 41 made of aluminum are supported in the rotating shaft support holes 27f of the struts 27e provided on the stationary funnels 27 (the parts 30) to be rotatable. Also, steps 41a are provided on one and the other ends of the rotating shafts 41, the steps 41a abutting against opened ends of the rotating shaft support holes 27f of the struts 27e. Therefore, the rotating shafts 41 are inhibited from moving axially.

Also, as shown in FIG. 9, the parallel links 42, respectively, are mounted on one and the other ends of the rotating shafts 41 so as to turn together with the rotating shafts 41. As shown in FIGS. 5 to 8, the parallel links 42 comprise an upper linkage member 43 made of a resin and mounted to the upper rotating shaft 41 and a lower linkage member 44 made of a resin and mounted to the lower rotating shaft 41. Note that the upper linkage member 43 and the lower linkage member 44 are examples of "linkage members." In addition, the rotating shafts 41 are referred to herein as "stationary shafts" because they are carried by the stationary funnels 27 even though the shafts 41 are capable of rotation and, thus, are not completely stationary.

As shown in FIG. 22, the upper rotating shaft 41 in the form of a round rod and two upper linkage members 43 are structured so that the upper rotating shaft 41 made of aluminum and the two upper linkage members 43 made of a resin are formed integrally. That is, respective rotating shaft insertion holes 43b, described later, of the two upper linkage members 43 are mounted to the rotating shaft 41 in the form of a round rod by means of insert molding. Also, the lower rotating shaft 41 and the lower linkage members 44 are structured by means of insert molding in the same manner as the upper rotating shaft 41 and the upper linkage members 43. Thereby, the respective upper and lower rotating shafts 41, the upper linkage members 43, and the lower linkage members 44 are arranged downstream of the air flow relative to the air filter 26 as shown in FIGS. 3 and 22 and there is no need for removable joint members such as screws, etc. for joining, so that removable joint members such as screws, etc. do not drop in the air cleaner box 25 and the engine 14.

As shown in FIG. 22, the upper linkage member 43 comprises a fitting portion 43a, a rotating shaft insertion hole 43b, and two stops 43c, 43d. As shown in FIGS. 5 to 8, the upper support shaft 28b (the small-diameter portion 28c) of the movable funnel 28 is fitted into the fitting portion 43a of the upper linkage member 43 with the split bushing 33 therebetween. Thereby, the upper linkage member 43 is made rotatable relative to the upper support shaft 28b. That is, the fitting portion 43a supports the support shaft 28b. That is, as described above, the fitting portion 43a supports the part 32, in which the two movable funnel 28 are made integral, at the axis which passes through the center of gravity of the part. Thereby, the support shafts 28b are inhibited from being twisted by dead loads of the respective movable funnels 28 included in the part 32, so that it becomes possible to smoothly move the movable funnels 28. Also, as shown in FIGS. 22 and 23, the fitting portion 43a comprises a split portion 43e extending in an axial direction (C direction) of the support shaft 28b and is structured to be elastically deformable so as to increase a split width of the split portion 43e. Note that the split portion 43e is an example of "second split." With the fitting portion 43a structured in the manner described above, the split portion 43e of the fitting portion 43a is pushed against the split bushing 33 (the support shaft 28b) in an F direction whereby the split bushing 33 (the support shaft 28b) is interposed by the split portion 43e of the fitting portion 43a. By pushing the fitting portion 43a further in the F direction from the state shown in FIG. 24, it becomes possible to fit the fitting portion 43a into the split bushing 33 (the support shaft 28b) as shown in FIG. 22.

As shown in FIGS. 5 to 8, the upper rotating shaft 41 is inserted into the rotating shaft insertion hole 43b of the upper linkage member 43 so that the upper linkage member 43 turns together with the upper rotating shaft 41. Also, as shown in FIG. 6, the stop 43c on the upper linkage member 43 functions to abut against the strut 27e of the stationary funnel 27 to inhibit turning of the upper linkage member 43 in a G direction in the case where the upper linkage member 43 turns a predetermined amount in the G direction. Also, as shown in FIG. 8, the stop 43d on the upper linkage member 43 functions to abut against the strut 27e of the stationary funnel 27 to inhibit turning of the upper linkage member 43 in an H direction in the case where the upper linkage member 43 turns a predetermined amount in the H direction. Note that the stops 43c, 43d, respectively, are examples of "first stop" and "second stop."

As shown in FIG. 9, the upper linkage member 43 supporting one of the movable funnels 28 (the parts 32) is provided with a support 43f which is supported by a moving member 49 described later. As shown in FIGS. 9 and 22, the support 43f comprises a pair of interposing pieces 43h, respectively, formed with a notch 43g, and is arranged on an opposite side to the fitting portion 43a. In addition, as shown in FIG. 9, the upper linkage member 43 supporting the other of the movable funnels 28 (the parts 32) is not provided with such support 43f.

Also, as shown in FIGS. 6 and 8, the lower linkage member 44 comprises a fitting portion 44a and a rotating shaft insertion hole 44b. The lower support shaft 28b (the small-diameter portion 28c) of the movable funnel 28 is fitted into the fitting portion 44a of the lower linkage member 44 with the split bushing 33 therebetween. Thereby, the lower linkage member 44 is made rotatable relative to the lower support shaft 28b. Also, the fitting portion 44a comprises a split portion 44c extending in the axial direction of the support shaft 28b and is structured to be elastically deformable so as to increase a split width of the split portion 44c. The split portion 44c has the same function as that of the split portion 43e of the upper linkage member 43. Note that the split portion 44c is an example of "second split." The lower rotating shaft 41 is inserted into the rotating shaft insertion hole 44b of the lower linkage member 44 so that the lower linkage member 44 turns together with the lower rotating shaft 41. In addition, as shown in FIG. 9, a linkage member 44d including a fitting portion 44a, a rotating shaft insertion hole 44b, and a split portion 44c, which are the same as those of the lower linkage member 44, is arranged between the parts 32 in which the two adjacent movable funnels 28 are formed integral with each other.

With the parallel linkage 42 is structured in the manner described above, the movable funnels 28 are moved in a direction away from the stationary funnels 27 in the case where the parallel links 42 are turned in the G direction as shown in FIG. 6. Also, as shown in FIG. 8, the movable funnels 28 are moved in a direction toward the stationary funnels 27 in the case where the parallel links 42 are turned in the H direction. Here, as shown in FIGS. 6 and 8, turning amounts of the parallel links 42 are adjusted so that outlet end 28a of the movable funnels 28 in the separated position (state shown in FIG. 6) and the outlet end 28a of the movable funnels 28 in the abutting position (state shown in FIG. 8) are positioned in the same manner as viewed in a direction in which the stationary funnels 27 are opened, or along an axis defined by the inlet end 27a of the stationary funnel 27. In other words, the radial position of the outlet end 28a of the movable funnel 28, in both the separated position and the abutting position, are substantially the same relative to the axis defined by the inlet end 27a of the stationary funnel 27.

The amount of rotation of the parallel linkage 42 is adjusted so that a position of the upper support shaft 28b in the separated position (state shown in FIG. 6) as viewed along an axis defined by the inlet end 27a of the stationary funnel 27, and a position of the upper support shaft 28b in the abutting position (state shown in FIG. 8) as viewed along an axis defined by the inlet end 27a of the stationary funnel 27, become the same and a position of the lower support shaft 28b in the separated position (state shown in FIG. 6) as viewed along an axis defined by the inlet end 27a of the stationary funnel 27, and a position of the lower support shaft 28b in the abutting position (state shown in FIG. 8) as viewed along an axis defined by the inlet end 27a of the stationary funnel 27, become the same. Further, the amount of rotation of the parallel linkage 42 is adjusted so that a position of the upper support shaft 28b in the separated position (state shown in FIG. 6) as viewed along an axis defined by the inlet end 27a of the stationary funnel 27, and a position of the lower support shaft 28b in the abutting position (state shown in FIG. 8) as viewed along an axis defined by the inlet end 27a of the stationary funnel 27, are substantially the same and a position of the upper support shaft 28b in the abutting position (state shown in FIG. 8) as viewed along an axis defined by the inlet end 27a of the stationary funnel 27, and a position of the lower support shaft 28b in the abutting position (state shown in FIG. 8) as viewed along an axis defined by the inlet end 27a of the stationary funnel 27, are substantially the same.

As shown in FIG. 6, the stop 43c on the parallel linkage 42 (the upper linkage member 43) is adjusted so as to abut against the strut 27e in the case where the movable funnels 28 reach the separated position. Also, as shown in FIG. 8, the stop 43d on the parallel linkage 42 (the upper linkage member 43) is adjusted so as to abut against the strut 27e in the case where the movable funnels 28 reach the abutting position.

Also, as shown in FIGS. 6, 9, and 25, the parallel linkage 42 including the upper linkage member 43 and the lower linkage member 44 is structured so as to be rotatable by a drive force of a motor 45. Specifically, one end of a turning lever 46 is mounted to an output shaft 45a of the motor 45. A substantially spherical-shaped support portion 46a is provided on the other end of the turning lever 46. A connecting member 47 is mounted to the spherical-shaped support portion 46a of the turning lever 46 to be swingable relative to the support portion 46a, and a moving shaft 48 is mounted to the connecting member 47. As shown in FIG. 26, the moving shaft 48 is provided with an upper push portion 48a and a lower push portion 48b. The upper push portion 48a is arranged at an opposite end of the moving shaft 48 to the connecting member 47 (see FIG. 25) and the lower push portion 48b is arranged in a region of the moving shaft 48 at a predetermined interval in a downward direction from the upper push portion 48a.

The moving member 49 is arranged on one end side of the moving shaft 48 on which the upper push portion 48a (the lower push portion 48b) is provided. As shown in FIG. 25, projections 49a are provided on both side surfaces of the moving member 49 to engage with the pair of notches 43g formed on the upper linkage member 43. The interposing pieces 43h of the upper linkage member 43 are arranged so as to interpose therebetween the moving member 49 and the notches 43g are caused to engage with the projections 49a whereby the upper linkage member 43 (the support 43f) is supported by the moving member 49. Also, as shown in FIG. 26, bushings 50a, 50b are provided in the inside of the moving member 49 to support the moving shaft 48 slidably. The bushings 50a, 50b are arranged between the upper push portion 48a and the lower push portion 48b. A compression spring 51 is mounted between the bushings 50a, 50b within the moving member 49. Note that the compression spring 51 is an example of "bias member."

In the case where a drive force of the motor 45 turns the turning lever 46 in an I direction (state shown in FIG. 25), the moving shaft 48 is moved in a J direction as shown in FIG. 26 to cause the compression spring 51 to generate a biasing force in the J direction, so that the moving member 49 is biased by the compression spring 51 in the J direction. Therefore, since the biasing force of the compression spring 51 (see FIG. 26) is transmitted to the parallel links 42 through the moving member 49 as shown in FIG. 6, the parallel links 42 are turned in the G direction. Also in a state that the stops 43c on the parallel links 42 abut against the struts 27e, the biasing force of the compression spring 51 (see FIG. 26) is transmitted to the parallel links 42 through the moving member 49 in a direction tending to rotate the parallel linkage 42 in the G direction to maintain the stop 43c against the strut 27e.

On the other hand, in the case where the drive force of the motor 45 turns the turning lever 46 in a K direction (state shown in FIG. 27), the moving shaft 48 is moved in an L direction as shown in FIG. 28 to cause the compression spring 51 to generate a biasing force in the L direction, so that the moving member 49 is biased by the compression spring 51 in the L direction. Therefore, since the biasing force of the compression spring 51 (see FIG. 28) is transmitted to the parallel links 42 through the moving member 49 as shown in FIG. 8, the parallel links 42 are turned in the H direction. Also in a state that the stops 43d on the parallel links 42 abut against the struts 27e, the biasing force of the compression spring 51 (see FIG. 28) is transmitted to the parallel links 42 through the moving member 49 in a direction tending to move the parallel links 42 in the H direction to maintain the stop 43d against the strut 27e. Thus, the moving shaft 48, moving member 49 and the compression spring 51 operate as a lost motion device.

An operation of the intake passage connecting the cylinders 16 to the air cleaner box 25 being varied in length is described with reference to FIGS. 3, 6, 8 and 25 to 28. In the case where the engine 14 shown in FIG. 3 rotates at high speed, the intake pipes are made short in order to make it easy to obtain a pulsation effect. That is, in the case where the engine 14 rotates at high speed, the movable funnels 28 are moved to the separated position.

Specifically, the motor 45 of the funnel moving mechanism 29 turns the turning lever 46 in the I direction as shown in FIG. 25 whereby the moving shaft 48 is moved in the J direction. Thereby, a biasing force in the J direction is generated on the compression spring 51 (see FIG. 26) as shown in FIG. 6 whereby the moving shaft 48 is moved in the J direction, so that the parallel links 42 are turned in the G direction. Thereafter, turning of the parallel links 42 in the G direction continues until the stops 43c on the upper linkage member 43 abut against the struts 27e.

Thereby, the movable funnels 28 are moved to the separated position in a state that outlet or the outlet end 28a of the movable funnels 28 are maintained in parallel to inlet or the inlet end 27a of the stationary funnels 27. Consequently, in the case where the engine 14 (see FIG. 3) rotates at high speed, the stationary funnels 27, the throttle body 18 (see FIG. 3), and the intake ports 17a (see FIG. 3) constitute intake pipes, so that the intake pipes are made short. Here, in the case where the intake pipes are made short when the engine 14 shown in FIG. 3 rotates at high speed, high pressure waves become liable to reach the openings of the intake ports 17a toward the cylinders 16 when the intake valves 19a are opened, so that an improvement in intake efficiency is achieved.

In addition, as shown in FIG. 6, in a state that the movable funnels 28 reach the separated position, the positions of the outlet or outlet end 28a of the movable funnels 28 are the same as the position of the outlet or outlet end 28a of the movable funnels 28 in the abutting position (state shown in FIG. 8) as viewed in a direction along the axis of the inlet or inlet end 27a the stationary funnels 27. Also, in a state that the movable funnels 28 reach the separated position, the biasing force of the compression spring 51 (see FIG. 26) is transmitted to the parallel linkage 42 through the moving member 49 so that the parallel links 42 are turned in the G direction or maintained in the separated position.

When the engine 14 shown in FIG. 3 rotates at low speed, the intake pipes are made long in order to make it easy to obtain a pulsation effect. That is, in the case where the engine 14 rotates at low speed, the movable funnels 28 are moved to the abutting position.

Specifically, as shown in FIG. 27, the motor 45 of the funnel moving mechanism 29 first turns the turning lever 46 in the K direction whereby the moving shaft 48 is moved in the L direction. Thereby, a biasing force in the L direction is generated on the compression spring 51 (see FIG. 28) as shown in FIG. 8 whereby the moving member 49 is moved in the L direction, so that the parallel links 42 are turned in the H direction. Thereafter, turning of the parallel links 42 in the H direction continues until the stops 43d on the upper linkage member 43 abut against the struts 27e.

Thereby, the movable funnels 28 are moved to the abutting position while the outlets or the outlet ends 28a of the movable funnels 28 are maintained in parallel to the inlets or the inlet ends 27a of the stationary funnels 27. Consequently, in the case where the engine 14 (see FIG. 3) rotates at low speed, the movable funnels 28, the stationary funnels 27, the throttle body 18 (see FIG. 3), and the intake ports 17a (see FIG. 3) constitute intake passages, so that the intake passages are relatively lengthened. Here, in the case where the intake pipes are lengthened when the engine 14 shown in FIG. 3 rotates at low speed, high pressure waves become liable to reach the openings of the intake ports 17a toward the cylinders 16 when the intake valves 19a are opened, so that an improvement in intake efficiency is achieved.

In addition, in a state that the movable funnels 28 reach the abutting position as shown in FIG. 8, the biasing force of the compression spring 51 (see FIG. 28) is transmitted to the parallel linkage 42 through the moving member 49 so that the parallel linkage 42 receives a force tending to turn the linkage 42 in the H direction to maintain the movable funnels 28 in the abutting position.

As described above, the parallel linkage 42 including the upper linkage member 43 and the lower linkage member 44, which movably support the movable funnels 28, is provided and the movable funnels 28 are moved by the use of the parallel linkage 42 whereby the outlet ends 28a of the movable funnels 28 can be separated from and abut against the inlet ends 27a of the stationary funnels 27 while the outlet opening of the outlet ends 28a of the movable funnels 28 are maintained in parallel to the inlet opening of the inlet ends 27a of the stationary funnels 27. Thereby, even when the outlet ends 28a of the movable funnels 28 are separated from the inlet ends 27a of the stationary funnels 27, in the case where the engine 14 rotates at high speed, the air passing through the movable funnels 28 and into the stationary funnels 27 can be caused to flow linearly, so that it is possible to inhibit the air from being increased in flow resistance. Consequently, in the case where the engine 14 rotates at high speed (in the case where the movable funnels 28 are caused to separate from the stationary funnels 27), it is possible to inhibit a decrease in intake efficiency.

Also, as described above, an amount of rotation of the parallel linkage 42 is adjusted so that the outlet of the outlet ends 28a of the movable funnels 28 in the separated position and the outlet of the outlet ends 28a of the movable funnels 28 in the abutting position are positioned in the same manner as viewed in a direction along the axis of the inlet ends 27a of the stationary funnels 27, whereby in the case where the movable funnels 28 are moved to the separated position from the abutting position (in the case where the engine 14 rotates at high speed), substantially the entire volume of air passing through the movable funnels 28 and into the stationary funnels 27 flows linearly, so that it is possible to further inhibit the air from being increased in flow resistance.

As described above, the support shafts 28b are provided integral with the movable funnels 28 whereby there is no need of subsequently mounting the support shafts 28b to the movable funnels 28 by screws, so that it is possible to inhibit parts such as screws, etc. from coming off to give rise to a failure. Also, since the movable funnels 28 and the support shafts 28b can be made one part, it is possible to reduce the number of parts.

As described above, two movable funnels 28 can be supported movably by the same parallel linkage 42 by forming the two movable funnels 28 integrally through the support shafts 28b which are arranged between two adjacent movable funnels 28, and fitting the parallel linkage 42 onto the support shafts 28b arranged between the two adjacent movable funnels 28. Thereby, the parallel linkages 42 can be reduced in number as compared with the case where a parallel linkage 42 is provided on each movable funnel 28. Also, since two movable funnels 28 can be made one part, it is possible to reduce the number of parts.

Also, as described above, the split bushing 33 mounted to the support shaft 28b is structured to include the split 33a extending axially of the support shaft 28b and to be elastically deformable so that a split width of the split 33a is increased, whereby the split bushing 33 can be mounted to the support shaft 28b through the split 33a radially of the support shaft 28b by elastically deforming the split bushing 33 so that a split width of the split 33a is increased, even when it becomes difficult to mount the split bushing 33 axially of the support shaft 28b due to integral formation of the support shaft 28b between two movable funnels 28.

As described above, the ribs 28d, 28e for engagement with the split 33a of the split bushing 33 are provided on the support shaft 28b whereby the ribs 28d, 28e of the support shaft 28b and the split 33a of the split bushing 33 engage with each other when the split bushing 33 is to be mounted to the support shaft 28b, so that it is possible to inhibit the split bushing 33 from rotating relative to the support shaft 28b. Thereby, the split bushing 33 can be readily mounted to the support shaft 28b.

Preferably, the split 33a positioned on the flange portion 33b of the split bushing 33 is formed so as to be increased in split width in a direction in which the flange portion 33b projects, whereby the split 33a can be readily and elastically deformed so that a split width of the split 33a is increased, by pushing the split bushing 33 radially of the support shaft 28b in a state that the flange portion 33b of the split bushing 33 is caused to abut against the support shaft 28b.

Also, as described above, the rib 28*e* of the support shaft 28*b* is formed on the end of the small-diameter portion 28*c* so as to extend radially of the support shaft 28*b* whereby it is possible to engage the rib 28*e* of the support shaft 28*b* with the split 33*a* positioned on the flange portion 33*b* of the split bushing 33, so that it is possible to further inhibit the split bushing 33 from rotating relative to the support shaft 28*b*.

As described above, the fitting portion 43*a* of the upper linkage member 43 is structured to include the split portion 43*e* extending axially of the support shaft 28*b* and to be elastically deformable so as to increase a split width of the split portion 43*e* whereby the fitting portion 43*a* can be fitted onto the support shaft 28*b* through the split portion 43*e* radially of the support shaft 28*b* by elastically deforming the fitting portion 43*a* so that a split width of the split portion 43*e* is increased, even when it becomes difficult to fit the fitting portion 43*a* of the upper linkage member 43 axially of the support shaft 28*b* due to integral formation of the support shaft 28*b* between two adjacent movable funnels 28. In addition, the same effect as that of the upper linkage member 43 can be obtained for the lower linkage member 44.

Also, according to the first embodiment, as described above, the stationary funnels 27 are fixed to the air cleaner box 25 and the struts 27*e* provided integrally on the stationary funnels 27 support ends of the rotating shafts 41 so as not to move the rotating shafts 41 axially whereby it is possible to inhibit the ends of the rotating shafts 41 from coming off the rotating shaft support holes 27*f* of the struts 27*e* in a state that the stationary funnels 27 are fixed to the air cleaner box 25, due to axial movements of the rotating shafts 41 supported by the struts 27*e*. Thereby, since the rotating shafts 41 are kept inserted into the rotating shaft insertion hole 43*b* of the upper linkage member 43 while the stationary funnels 27 are fixed to the air cleaner box 25, it is possible to inhibit the upper linkage member 43 from coming off the ends of the rotating shafts 41. In addition, the same effect as that of the upper linkage member 43 can be obtained for the lower linkage member 44.

Also, as described above, the steps 41*a* adapted to abut against the opened ends of the rotating shaft support holes 27*f* of the struts 27*e* are provided on one and the other ends of the rotating shafts 41 whereby it is possible to readily inhibit the rotating shafts 41, which are supported by the struts 27*e*, from moving axially of the rotating shafts 41.

Preferably, the upper linkage member 43 is provided with the stop 43*c* which abuts against the strut 27*e* to inhibit turning of the upper linkage member 43 in the G direction in the case where the upper linkage member 43 turns in the G direction to thereby cause the movable funnels 28 to reach the separated position, and the stop 43*d* which abuts against the strut 27*e* to inhibit turning of the upper linkage member 43 in the H direction in the case where the upper linkage member 43 turns in the H direction to thereby cause the movable funnels 28 to move to the abutting position, whereby it is possible to inhibit generation of an inconvenience that the movable funnels 28 are moved to a position shifted from the separated position in the case where the movable funnels 28 are to be moved to the separated position, due to excessive turning amounts of the upper linkage member 43 in the G direction. Also, it is possible to inhibit generation of an inconvenience that the movable funnels 28 are moved to a position shifted from the abutting position in the case where the movable funnels 28 are to be moved to the abutting position, due to excessive turning amounts of the upper linkage member 43 in the H direction.

Also, as described above, the stops 43*c*, 43*d* of the upper linkage member 43 are caused to abut against the strut 27*e* provided integrally on the stationary funnels 27 to restrict turning of the upper linkage member 43 whereby there is no need of separately providing abutment members, which abut against the stops 43*c*, 43*d*, so that it is possible to reduce the number of parts.

Also, according to the first embodiment, as described above, in the case where the upper linkage member 43 turns in the G direction to cause the stop 43*c* to abut against the strut 27*e*, the biasing force of the compression spring 51 continues to be transmitted to the upper linkage member 43 through the moving member 49 so that a force on the upper linkage member 43 is maintained in the G direction, and in the case where the upper linkage member 43 turns in the H direction to cause the stop 43*d* to abut against the strut 27*e*, the biasing force of the compression spring 51 continues to be transmitted to the upper linkage member 43 through the moving member 49 so that a force on the upper linkage member 43 is maintained in the H direction, whereby the stop 43*c* on the upper linkage member 43 is kept abutted against the strut 27*e* by the biasing force of the compression spring 51 in the case where the upper linkage member 43 turns in the G direction to cause the stop 43*c* to abut against the strut 27*e* (in the case where the movable funnels 28 reach the separated position). Thereby, it is possible to inhibit the movable funnels 28 from being moved to a position shifted from the abutting position in the case where the movable funnels 28 are to be held in the separated position. Also, in the case where the upper linkage member 43 turns in the H direction to cause the stop 43*d* to abut against the strut 27*e* (in the case where the movable funnels 28 reach the abutting position), the stop 43*d* on the upper linkage member 43 is kept abutted against the strut 27*e* by the biasing force of the compression spring 51. Thereby, it is possible to inhibit the movable funnels 28 from being moved to a position shifted from the abutting position in the case where the movable funnels 28 are to be held in the abutting position.

As described above, the engagement portion 27*d* is provided on the inner surface of the screw insertion hole 27*c* of the stationary funnel 27 to engage with the head 31*a* of the screw 31 whereby engagement of the head 31*a* of the screw 31 with the engagement portion 27*d* makes it possible to inhibit the screw 31 from coming off the screw insertion hole 27*c* even when the stationary funnels 27 are carried in a state that the screw 31 is inserted into the screw insertion hole 27*c*. Also, the engagement portion 27*d* of the screw insertion hole 27*c* is structured to be elastically deformable toward an outside of the screw insertion hole 27*c* from an inside thereof whereby in mounting the stationary funnels 27 to the engine 14, engagement of the head 31*a* of the screw 31 with the engagement portion 27*d* can be released by elastically deforming the engagement portion 27*d* of the screw insertion hole 27*c*. Thereby, it is possible to readily mount the stationary funnels 27 to the engine 14 by means of the screw 31 inserted into the screw insertion hole 27*c*.

Also, as described above, the rubber lips or annular members 34 are mounted to the outlet ends 28*a* of the movable funnels 28 whereby the rubber lips 34 can fill clearances between the movable funnels 28 and the stationary funnels 27 in the case where the movable funnels 28 are moved to the abutting position (state shown in FIG. 8). Thereby, it is possible to inhibit the air from leaking between the movable funnels 28 and the stationary funnels 27.

Preferably, as described above, the respective upper and lower rotating shafts 41 made of a metal, the upper linkage members 43, and the lower linkage members 44, both of which are made of a resin, respectively, are formed integrally, whereby the rotating shafts 41 made of a metal enable readily ensuring stiffness for the respective upper and lower rotating shafts 41, and the upper linkage members 43 and the lower linkage members 44, both of which are made of a resin, enable readily and elastically deforming the upper linkage members 43 and the lower linkage members 44.

FIGS. 29 to 33 illustrating details of a modification of the parallel linkage described above. As shown in FIGS. 29 and 31, the upper rotating shaft 61 and two upper linkage members 63 are structured so that the upper rotating shaft 61 made of aluminum and two upper linkage members 63 made of a resin are formed integrally. That is, respective rotating shaft insertion holes 63b of the two upper linkage members 63 are mounted to the respective joint 61b of the rotating shaft 61 by means of insert molding in the same manner as in the first embodiment. Also, as shown in FIGS. 30 and 32, the lower rotating shaft 61 and the lower linkage members 64 are also formed by means of insert molding in the same manner as the upper rotating shaft 61 and the upper linkage members 63. Note that the upper linkage members 63 and the lower linkage members 64 are examples of "linkage member."

Also, as shown in FIGS. 29 to 33, outer peripheral surface portions of the respective upper and lower rotating shafts 61 are cut to form flat surface portions 61c on the respective joints 61b in which the rotating shaft insertion holes 63b of the upper linkage members 63 and the rotating shaft insertion holes 64b of the lower linkage members 64, respectively, are mounted to the respective upper and lower rotating shafts 61. Thereby, it becomes possible to readily inhibit the upper linkage members 63 and the lower linkage members 64 from idling relative to the respective joints 61b on the respective upper and lower rotating shafts 61. In addition, the remaining construction and operation of the modified parallel linkage preferably are the same as those of that described above.

The flat surface portions 61c are provided on the joints 61b of the rotating shafts 61 in the form of round shafts so as to prevent rotation of the upper linkage member 63 and the lower linkage member 64, both of which are made of a resin, whereby it is possible to inhibit the upper linkage member 63 and the lower linkage member 64 from idling relative to the rotating shafts 61, so that it is possible to inhibit generation of dispersion in movements of the movable funnels 28 due to rotation of the upper linkage member 63 and the lower linkage member 64 relative to the rotating shafts 61.

It should be understood that the embodiments disclosed herein are exemplary and not limitative. The scope of the invention is not indicated by the descriptions of the embodiments described above but by the claims, and all changes which come within the meaning and range of equivalence of the claims are intended to be embraced therein.

While the embodiments are described with an example of an application of the invention to a motorcycle, the invention is not limited thereto but applicable to other vehicles than motorcycles.

Also, while the invention is applied to a vehicle mounting thereon a four-cylinder engine according to the embodiment, the invention is not limited thereto but applicable to a vehicle mounting thereon a multi-cylinder engine other a four-cylinder engine and a vehicle mounting thereon a single cylinder engine.

Also, while two movable funnels are made integrally according to the embodiments, the invention is not limited thereto but three or more movable funnels may be made integrally. Also, separate movable funnels may be arranged on every cylinder.

Also, while the second embodiment illustrates an example in which a single flat surface portion is provided on the rotating shaft, the invention is not limited thereto but a plurality of flat surface portions may be provided on the rotating shaft.

Also, while according to the second embodiment the respective joints 61b of the upper and lower rotating shafts 61, to which the rotating shaft insertion holes 63b of the upper linkage members 63 and the rotating shaft insertion holes 64b of the lower linkage members 64 are mounted, are structured to include the flat surface portions 61c, the invention is not limited thereto but a plurality of irregular portions 71c provided in an outer circumferential direction of a rotating shaft 71 by means of knurling may be included in joint portions 71b like the rotating shaft 71 according to a modification of the second embodiment. The plurality of irregular portions 71c enable readily inhibiting an upper linkage member 73 and a lower linkage member (not shown) from idling relative to the rotating shaft 71.

What is claimed is:

1. A vehicle having an engine air intake system, comprising;
    at least one stationary funnel through which air is delivered to an intake port of an engine, the stationary funnel having an inlet and an outlet;
    at least one movable funnel having an inlet and an outlet, the movable funnel disposed on an inlet side of the stationary funnel and cooperating with the stationary funnel to deliver air to the intake port of the engine; and
    a parallel linkage, the parallel linkage including a plurality of linkage members that extend parallel to each other on at least one side of the movable funnel to movably support the movable funnel relative to the stationary funnel.

2. A vehicle having an engine air intake system, comprising;
    at least one stationary funnel through which air is delivered to an intake port of an engine, the stationary funnel having an inlet and an outlet;
    at least one movable funnel having an inlet and an outlet, the movable funnel disposed on an inlet side of the stationary funnel and cooperating with the stationary funnel to deliver air to the intake port of the engine; and
    a parallel linkage, the parallel linkage including a plurality of linkage members that movably support the movable funnel relative to the stationary funnel;
    wherein at high engine speeds the linkage members rotate in a first direction whereby the movable funnel is moved to a first position wherein an outlet end of the movable funnel is spaced from an inlet end of the stationary funnel, and at low engine speeds the linkage members rotate in a second direction opposite the first direction such that the movable funnel is moved to a second position wherein the outlet end of the movable funnel abuts the inlet end of the stationary funnel.

3. The vehicle according to claim 2, wherein the linkage members are adapted such that a radial position of the outlet end of the movable funnel relative to an axis defined by the inlet end of the stationary funnel is substantially the same in both the first and second positions of the movable funnel.

4. The vehicle according to claim 3, further comprising an upper movable shaft and a lower movable shaft secured to the movable funnel, and an upper stationary shaft and a lower stationary shaft fixed relative to the stationary funnel, wherein the upper movable shaft and the upper stationary shaft are connected to one another through an upper linkage member of the parallel linkage and the lower movable shaft and the lower stationary shaft are connected to one another through a lower linkage member of the parallel linkage, wherein a radial position of the upper movable shaft and a radial position of the lower movable shaft in the first position of the movable funnel, relative to the axis defined by the inlet end of the stationary funnel, are substantially the same as a radial position of the upper movable shaft and a radial position of the lower movable shaft in the second position of the movable funnel, respectively.

5. The vehicle according to claim 4, wherein the radial position of the upper movable shaft and the radial position of the lower movable shaft, relative to the axis defined by the inlet end of the stationary funnel, are substantially the same in the first position of the movable funnel, and the radial position of the upper movable shaft and the radial position of the lower movable shaft, relative to the axis defined by the inlet end of the stationary funnel, are substantially the same in the second position of the movable funnel.

6. The vehicle according to claim 2, wherein the upper and lower movable shafts are integrally formed with the movable funnel, and ends of the upper and lower linkage members define a fining portion that rotatably supports the upper and lower movable shafts, respectively.

7. The vehicle according to claim 6, wherein the engine comprises an engine having a plurality of cylinders, and the at least one stationary funnel and the at least one movable funnel comprise one stationary funnel and one movable funnel for each respective one of the plurality of cylinders, wherein each of the movable funnels is integrally connected to another movable funnel by a portion of one of the upper movable shaft and the lower movable shaft.

8. The vehicle according to claim 7, further comprising a bushing disposed between each of the upper and lower linkage members and the upper and lower movable shafts, respectively, to permit the linkage members to rotate relative to the movable shafts, wherein the bushing comprises a first axial split, the bushing being elastically deformable so that a split width of the first split may be increased.

9. The vehicle according to claim 8, further comprising a rib provided on each of the upper and lower movable shafts, wherein each of the ribs engage with the first split of one of the bushings.

10. The vehicle according to claim 9, wherein the bushing includes a flange portion on at least one end of the bushing, the flange projecting in a radial direction and forming a tapered opening to the first split.

11. The vehicle according to claim 10, wherein each of the upper and lower movable shafts include a reduced-diameter portion over which the bushing is positioned, the rib comprising a first rib portion and a second rib portion, the first rib portion formed by an outer surface of the reduced-diameter portion and extending in an axial direction, and the second rib portion formed at an end of the reduced-diameter portion and extending in a radial direction.

12. The vehicle according to claim 7, wherein the fining portions of the linkage members define a second axial split, wherein the fining portions are elastically deformable so that a split width of the second split can be increased.

13. The vehicle according to claim 2, further comprising a rotatable shaft configured to rotate the parallel linkage, wherein at least one of the linkage members includes a support hole into which the rotating shaft is positioned so that the at least one linkage member is fixed for rotation with the rotating shaft, and further comprising a strut integrally formed with the stationary funnel to rotatably support an end of the rotating shaft and inhibit axial movement of the rotating shaft relative to the strut.

14. The vehicle according to claim 13, wherein the rotating shaft defines a step to abut against a surface of the strut that defines the support hole for the rotating shaft.

15. The vehicle according to claim 2, wherein the at least one of the linkage members includes a first stop to abut against an abutment surface to restrict rotation of the parallel linkage in the first direction beyond the first position of the movable funnel, and a second stop to abut against the abutment surface to restrict rotation of the parallel linkage in the second direction beyond the second position of the movable funnel.

16. The vehicle according to claim 15, further comprising a moving member that moves the parallel linkage and a biasing member to apply a biasing force to the moving member, wherein the biasing force of the bias member is transmitted to the parallel linkage through the moving member whereby the linkage members are rotated, wherein when rotation of the linkage members in the first direction causes the first stop to abut against the abutment surface, a biasing force of the bias member is transmitted to the parallel linkage through the moving member in a direction tending to rotate the linkage members in the first direction, and when rotation of the linkage members in the second direction causes the second stop to abut against the abutment surface, a biasing force of the bias member is transmitted to the parallel linkage through the moving member in a direction tending rotate the linkage members in the second direction.

17. The vehicle according to claim 16, wherein the abutment surface is formed by a strut provided integrally on the stationary funnel.

18. The vehicle according to claim 2, wherein the stationary funnel comprises a fastener insertion hole into which a fastener can be inserted, the stationary funnel is mounted to the engine by a fastener inserted into the fastener insertion hole, and the fastener insertion hole comprises an engagement portion which is structured to engage a head of the fastener and to be elastically deformable in a radially outward direction to permit the head of the fastener to pass by the engagement portion.

19. The vehicle according to claim 2, further comprising an annular seal member mounted to the outlet end of the movable funnel an arranged to contact the stationary funnel when the movable funnel is in the second position.

20. The vehicle according to claim 2, further comprising a rotating shaft which is capable of rotating the parallel linkage, wherein the rotating shaft is made of a metal, at least one of the plurality of linkage members are made of a resin, and the rotating shaft and the at least one linkage member are integrally formed.

21. The vehicle according to claim 20, wherein the rotating shaft is shaped so as to prevent rotation relative to the at least one linkage member.

22. The vehicle according to claim 21, wherein the rotating shaft is shaped in the form of a round rod and the joint at which the rotating shaft joins the at least one linkage member includes a flat surface portion.

23. The vehicle according to claim 21, wherein the rotating shaft is shaped in the form of a round rod and the joint at which the rotating shaft joins the linkage members includes an irregular portion provided along an outer periphery of the rotating shaft.

24. The vehicle according to claim 20, wherein the stationary funnel and the movable funnel are positioned within an intake air box, further comprising an air filter arranged in the intake air box portion to filter the air delivered to the intake port of the engine, wherein the parallel linkage and the rotating shaft are arranged downstream of the air filter.

25. The vehicle according to claim 2, wherein a the at least one movable funnel comprises a plurality of movable funnels connected to one another, and the linkage members support the plurality of funnel portions substantially at a center of gravity of the plurality of movable funnels.

* * * * *

UNITED STATES PATENT AND TRADEMARK OFFICE
CERTIFICATE OF CORRECTION

| | |
|---|---|
| PATENT NO. | : 7,418,937 B2 |
| APPLICATION NO. | : 11/623660 |
| DATED | : September 2, 2008 |
| INVENTOR(S) | : Yokoi Masato |

It is certified that error appears in the above-identified patent and that said Letters Patent is hereby corrected as shown below:

Col. 23, Claim 6, line 4, please change "fining" to --fitting--;

Col. 23, Claim 12, line 1, please change "fining" to --fitting--;

Col. 23, Claim 12, line 3, please change "fining" to --fitting--; and

Signed and Sealed this

Twenty-fourth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO.         : 7,418,937 B2
APPLICATION NO.    : 11/623660
DATED              : September 2, 2008
INVENTOR(S)        : Yokoi Masato It is certified that error appears in the above-identified patent and that said Letters Patent is hereby corrected as shown below:

Col. 23, Claim 6, line 20, please change "fining" to --fitting--;

Col. 23, Claim 12, line 57, please change "fining" to --fitting--;

Col. 23, Claim 12, line 59, please change "fining" to --fitting--; and

This certificate supersedes the Certificate of Correction issued March 24, 2009.

Signed and Sealed this

Fourteenth Day of April, 2009

JOHN DOLL
*Acting Director of the United States Patent and Trademark Office*